(12) United States Patent
Kanamori et al.

(10) Patent No.: US 8,700,242 B2
(45) Date of Patent: Apr. 15, 2014

(54) HYBRID VEHICLE

(75) Inventors: Iori Kanamori, Saitama (JP); Takefumi Ikegami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/509,240

(22) PCT Filed: Oct. 12, 2010

(86) PCT No.: PCT/JP2010/067878
§ 371 (c)(1),
(2), (4) Date: May 10, 2012

(87) PCT Pub. No.: WO2011/070848
PCT Pub. Date: Jun. 16, 2011

(65) Prior Publication Data
US 2012/0245781 A1   Sep. 27, 2012

(30) Foreign Application Priority Data

Dec. 8, 2009 (JP) ................. 2009-278935
Dec. 8, 2009 (JP) ................. 2009-278936
Dec. 8, 2009 (JP) ................. 2009-278937

(51) Int. Cl.
*B60W 20/00* (2006.01)
*B60W 10/06* (2006.01)
*B60W 10/08* (2006.01)
*B60W 10/26* (2006.01)

(52) U.S. Cl.
USPC ........................ 701/22; 180/65.265

(58) Field of Classification Search
USPC .......... 701/22; 180/65.265; 903/903
See application file for complete search history.

(56) References Cited

U.S. PATENT DOCUMENTS

| 2005/0044873 A1* | 3/2005 | Tamai et al. ............... 62/323.1 |
| 2009/0084618 A1* | 4/2009 | Thompson et al. ......... 180/65.8 |
| 2010/0065357 A1 | 3/2010 | Oyama et al. |

FOREIGN PATENT DOCUMENTS

| JP | 2003-232412 A | 8/2003 |
| JP | 2004-236381 A | 8/2004 |
| JP | 2004-245190 A | 9/2004 |
| JP | 2006-120334 A | 5/2006 |
| JP | 2006-174596 A | 6/2006 |
| JP | 2007-118721 A | 5/2007 |
| JP | 2007-215293 A | 8/2007 |
| JP | 2008-016229 A | 1/2008 |
| JP | 2008-201292 A | 9/2008 |
| JP | 2009-113670 A | 5/2009 |
| JP | 2009-248914 A | 10/2009 |
| JP | 2009-252688 A | 10/2009 |

* cited by examiner

*Primary Examiner* — Mary Cheung
*Assistant Examiner* — Brian P Sweeney
(74) *Attorney, Agent, or Firm* — Arent Fox LLP

(57) ABSTRACT

A transmission has a first transmission group which is capable of transmitting motive power from an electric motor and/or an engine to driven wheels and which is provided with a plurality of transmission stages having different transmission ratios and a second transmission group capable of transmitting motive power from the engine to the driven wheels. If the temperature of a battery detected by a temperature sensor is below a first predetermined temperature or a second predetermined temperature or higher, then an ECU sets the transmission stage of the first transmission group at an intermediate stage and carries out control so as to travel at an intermediate stage of the second transmission group which is adjacent to the intermediate stage of the first transmission group.

9 Claims, 18 Drawing Sheets

|  | LOW TEMPERATURE (HIGH TEMPERATURE) | | NORMAL TEMPERATURE | |
|---|---|---|---|---|
|  | PRE-DOWNSHIFT | PRE-UPSHIFT | PRE-DOWNSHIFT | PRE-UPSHIFT |
| SOC75% | 0.3s | 1.0s | 0.1s | 0.1s |
| SOC50% | 0.5s | 0.5s | 0.1s | 0.1s |
| SOC25% | 1.0s | 0.3s | 0.1s | 0.1s |

|  | LOW TEMPERATURE (HIGH TEMPERATURE) | | NORMAL TEMPERATURE | |
|---|---|---|---|---|
|  | PRE-DOWNSHIFT | PRE-UPSHIFT | PRE-DOWNSHIFT | PRE-UPSHIFT |
| SOC75% | 0.3s | 1.0s | 0.1s | 0.1s |
| SOC50% | 0.5s | 0.5s | 0.1s | 0.1s |
| SOC25% | 1.0s | 0.3s | 0.1s | 0.1s |

BATTERY CHARGE/DISCHARGE AMOUNTS IN THE PRESENT INVENTION

BATTERY CHARGE/DISCHARGE AMOUNTS IN COMPARATIVE EXAMPLE

HYBRID VEHICLE

CROSS-REFERENCE TO RELATED APPLICATION

This application is a National Stage entry of International Application No. PCT/JP2010/067878, filed Oct. 12, 2010, which claims priority to JP Patent Application No. 2009-278935, filed Dec. 8, 2009, JP Patent Application No. 2009-278936, filed Dec. 8, 2009 and JP Patent Application No. 2009-278937, filed Dec. 8, 2009. The disclosures of the prior applications are incorporated in their entirety by reference.

TECHNICAL FIELD

The present invention relates to a hybrid vehicle provided with an electric motor and an internal-combustion engine.

BACKGROUND ART

There has been known a hybrid vehicle having an internal-combustion engine (an engine) and an electric motor connected to an electricity storage device. For example, in a hybrid vehicle equipped with a stepped transmission, a low ambient temperature causes the oil temperature of the transmission and the temperature of the electricity storage device to decrease, affecting the gear shifting responsiveness of the stepped transmission and the use of the electric motor in some cases. At the time of shifting the gear, when synchronizing the rotations of the electric motor and rotating members, such as shafts and gears, which constitute the transmission, with the rotational speeds corresponding to the transmission ratio of a transmission stage, completing a gear shift requires predetermined time due to the inertial moments of the rotating members.

As an example, therefore, a controlling device of a vehicle drive apparatus, which restricts transmission stages when an extremely low temperature state is detected, has been disclosed in patent document 1 as a technique for improving the gear shift responsiveness at an extremely low temperature, such as 30 degrees below zero. In this device, the transmission ratios on a high speed end of the stepped transmission is prohibited, whereas a transmission ratio on a low speed end is selected to increase the numbers of revolutions (rotational speeds) of the rotating members constituting the transmission so as to accelerate a rise in the oil temperature of the transmission, thereby improving the gear shift responsiveness.

Further, patent document 2 discloses, as a technique for increasing the temperature of an electricity storage device, a controlling device of a vehicular battery. When a high possibility of an extremely low temperature state is predicted, the controlling device carries out control to increase the charge amount of the electricity storage device (battery) and then, in the case where the temperature of the battery is a predetermined temperature or lower, the battery is discharged to accelerate internal heat generation, thus increasing the temperature of the battery.

PRIOR ART DOCUMENTS

Patent Documents

Patent document 1: Japanese Patent Application Laid-Open No. 2007-118721
Patent document 2: Japanese Patent Application Laid-Open No. 2008-16229

SUMMARY OF THE INVENTION

Problem to be Solved by the Invention

However, when the temperature is low or high, the output of the electricity storage device decreases, as compared with the case where the temperature is normal. Hence, when making a downshift, in which the transmission stage of the transmission is switched to a lower stage, or an upshift, in which the transmission stage is switched to a higher stage, the output of an electric motor decreases, resulting in longer time to complete the gear shifting. In other words, there has been a problem in that the gear shifting responsiveness deteriorates (a delay in a gear shifting), leading to deteriorated driveability.

The device in patent document 1 described above is adapted to improve the gear shift responsiveness by accelerating the rise in the oil temperature of the transmission when the temperature is extremely low. It is difficult, however, to improve the delay in a gear shifting caused by the reduction in the output of the electricity storage device when the temperature is low or high.

Further, the device described in patent document 2 requires a complicated operation in which, when an extremely low temperature state is predicted, the control is carried out to increase the charge amount of the electricity storage device and then, in the case where the temperature of the battery is a predetermined temperature or lower, the battery is discharged. In addition, since the internal heat generation is accelerated merely by the discharge of the battery, there are cases where the temperature rise in the battery is relatively small and the responsiveness of the electric motor cannot be quickly improved, resulting in deteriorated driveability.

The present invention has been made with a view of the background described above, and it is an object of the invention to provide a hybrid vehicle which has an internal-combustion engine and an electric motor to which an electricity storage device is connected and which is capable of preventing the driveability from deteriorating even when the electricity storage device is under a low or high temperature.

Means to Solve the Problems

A first aspect of the present invention is a hybrid vehicle having an internal-combustion engine and an electric motor connected to an electricity storage device, and comprising a controller that enables the engagement/disengagement of the transfer of motive power from the electric motor and/or the internal-combustion engine to a driven section through the intermediary of a transmission and the transfer of the motive power between the electric motor and the internal-combustion engine, further comprising:

a temperature sensor which detects or estimates the temperature of the electricity storage device, wherein the transmission has a first transmission group which is capable of transferring the motive power from the electric motor and/or the internal-combustion engine to the driven section and which includes a plurality of transmission stages, which have different transmission ratios, and a second transmission group capable of transferring the motive power from the internal-combustion engine to the driven section, and the controller controls the outputs of the electric motor and the internal-combustion engine such that a transmission stage is shifted to either an intermediate stage of the first transmission group or a transmission stage of the second transmission group that is adjacent to the intermediate stage in a low temperature state, in which the temperature is below a first predetermined temperature, or a high temperature state, in which the temperature is equal to or higher than a second predetermined temperature, which is higher than the first predetermined temperature.

According to the first aspect of the present invention, the controller implements a travel by shifting the gear to either an intermediate stage of the first transmission group or a transmission stage of the second transmission group that is adjacent to the intermediate stage in the low temperature state or the high temperature state. This arrangement obviates the need for an operation for synchronizing the rotational speeds with a target transmission stage by the electric motor at the time of shifting the gear, and makes it possible to restrain a delay in shifting the gear by controlling the time required for shifting the gear when effecting a downshift or an upshift even if the output of the electricity storage device falls.

Thus, the present invention provides the hybrid vehicle that does not suffer from deteriorated gear shift responsiveness, i.e., deteriorated driveability, whether the temperature is low or high.

In the hybrid vehicle according to the first aspect of the present invention, preferably, the controller has a control map which defines a first, a second, and a third control patterns for controlling the outputs of the electric motor and the internal-combustion engine in the low temperature state, the high temperature state, and a normal state, which is neither the low temperature state nor the high temperature state, and in the low temperature state or the high temperature state, control is carried out on the basis of the control map of the first or the second control pattern that has been switched from the third control pattern corresponding to the normal state.

This arrangement makes it possible to restrain a delay in gear shifting in the low temperature state or the high temperature state by carrying out control according to the first or the second control pattern of the control map in the low temperature state or the high temperature state. Thus, a vehicle that does not incur deterioration in the gear shift responsiveness or driveability whether the temperature is low or high can be obtained.

In the hybrid vehicle according to the first aspect having the aforesaid construction, preferably, the controller carries out control to run the electric motor by enabling the transmission of the motive power from the internal-combustion engine to the driven section through the intermediary of the second transmission group and also enabling the transmission of the motive power between the electric motor and the driven section through the intermediary of the first transmission group.

With this arrangement, the electricity storage device can be charged by running the electric motor. In other words, the electricity storage device is warmed by passing current through an internal resistor of the electricity storage device. This makes it possible to raise the temperature of the electricity storage device from a low temperature (below the first predetermined temperature) to a normal temperature (the first predetermined temperature or higher but below the second predetermined temperature) in relatively short time. Therefore, the travel mode in the state wherein the temperature of the electricity storage device is low can be changed to the travel mode in which the temperature of the electricity storage device is the normal temperature in relatively short time.

Further, in this case, the controller preferably carries out control so as to enable the transmission of the motive power between the electric motor and the internal-combustion engine in the low temperature state and also to transmit the motive power from the internal-combustion engine and the electric motor to the driven wheel through the intermediary of the first transmission group.

With this arrangement, the controller enables the transmission of the motive power between the electric motor and the internal-combustion engine and also causes the motive power to be transmitted from the internal-combustion engine and the electric motor to the driven section through the intermediary of the first transmission group in the low temperature state. In other words, the electricity storage device is warmed by passing current through the internal resistor of the electricity storage device.

Thus, the temperature of the electricity storage device can be raised from a low temperature (below the first predetermined temperature) to the normal temperature (the first predetermined temperature or higher but below the second predetermined temperature) in relatively short time. Therefore, the travel mode in the state wherein the temperature of the electricity storage device is low can be changed to the travel mode in which the temperature thereof is the normal temperature in relatively short time.

Further, preferably, the hybrid vehicle according to the first aspect of the present invention includes an assist device which is driven by the output of the electric motor or the internal-combustion engine, wherein the assist device is driven at an intermediate stage of the first transmission group in the high temperature state. This arrangement allows the temperature of the electricity storage device to decrease by driving the assist device when the temperature is high, thus making it possible to restrain the output of the electricity storage device from falling.

The assist device is, for example, a compressor of a vehicle-mounted air conditioning unit, and a battery main body of the electricity storage device can be cooled through the interior of the vehicle by driving the compressor.

A second aspect of the present invention is a hybrid vehicle having an internal-combustion engine and an electric motor connected to an electricity storage device, and comprising a controller that enables the engagement/disengagement of the transfer of motive power from the electric motor and/or the internal-combustion engine to a driven section through the intermediary of a transmission and the transfer of the motive power between the electric motor and the internal-combustion engine, further comprising: a temperature sensor which detects or estimates the temperature of the electricity storage device, wherein the transmission has a first transmission group which is capable of transmitting the motive power from the electric motor and/or the internal-combustion engine to the driven section and which includes a plurality of transmission stages, which have different transmission ratios, and a second transmission group capable of transmitting the motive power from the internal-combustion engine to the driven section, and the controller enables the transmission of the motive power from the internal-combustion engine to the driven section through the intermediary of the second transmission group and controls the charge/discharge of the electricity storage device in a low temperature state in which the temperature detected or estimated by the temperature sensor is lower than a first predetermined temperature.

According to the second aspect of the present invention, the controller enables the transmission of the motive power from the internal-combustion engine to the driven section through the intermediary of the second transmission group and also controls the charge/discharge of the electricity storage device in the low temperature state, thereby allowing the electricity storage device to be warmed. In other words, when the electricity storage device is in the low temperature state, the electricity storage device can be easily warmed and the temperature thereof can be raised to the normal temperature in relatively short time by setting a state, in which a speedchangeable travel is effected by the internal-combustion engine rather than the electric motor through the intermediary of the second transmission group, and also by controlling the charge/discharge of the electricity storage device. Thus, the time required to change the travel mode in the low temperature state to the normal travel mode can be reduced to relatively short time, thereby permitting improved driveability.

In the hybrid vehicle according to the second aspect of the present invention, the controller sets the first transmission group of the transmission to a neutral state and controls the charge/discharge of the electricity storage device in a low temperature state in which the temperature detected or estimated by the temperature sensor is lower than a first predetermined temperature.

This arrangement enables the controller to set the first transmission group of the transmission to the neutral state and charge or discharge the electricity storage device in the low temperature state, thereby warming the electricity storage device. In other words, the temperature can be increased so as to increase the output of the electricity storage device by controlling the charge/discharge of the electricity storage device such that the transmission of the motive power from the electric motor to the driven section will not be affected. This makes it possible to reduce the time required for switching the travel mode in the low temperature state to the normal travel mode to relatively short time, thus permitting improved driveability.

Further, a third aspect of the present invention provides a hybrid vehicle having an internal-combustion engine and an electric motor connected to an electricity storage device, and comprising a controller that enables the engagement/disengagement of the transfer of motive power from the electric motor and/or the internal-combustion engine to a driven section through the intermediary of a transmission and the transfer of the motive power between the electric motor and the internal-combustion engine, further comprising a temperature sensor which detects or estimates the temperature of the electricity storage device, wherein the controller sets the transmission in a neutral state and controls the charge/discharge of the electricity storage device in a low temperature state, in which the temperature detected or estimated by the temperature sensor is lower than a first predetermined temperature.

The third aspect of the present invention enables the controller to set the transmission to the neutral state and charge or discharge the electricity storage device in the low temperature state, thereby warming the electricity storage device. In other words, the temperature can be increased so as to increase the output of the electricity storage device by controlling the charge/discharge of the electricity storage device such that the transmission of the motive power from the electric motor to the driven section will not be affected. This makes it possible to reduce the time required for switching the travel mode in the low temperature state to the normal travel mode to relatively short time, thus permitting improved driveability.

In the second aspect or the third aspect of the present invention, the controller preferably controls the charge/discharge of the electricity storage device by a sinusoidal waveform of a frequency that is higher than a predetermined frequency. This permits relatively easy charge/discharge of the electricity storage device. Further, passing alternating current through the internal resistor of the electricity storage device makes it possible to reduce a load on the electricity storage device at the time of charge or discharge. Further, the electricity storage device can be warmed relatively easily with low load. This makes it possible to reduce the time required for switching the travel mode in the low temperature state to the normal travel mode to relatively short time, thus permitting improved driveability.

Further, in the second aspect, preferably, an air conditioning unit driven through the intermediary of the first transmission group is provided, wherein the controller drives the air conditioning unit by the electric motor in the low temperature state. This arrangement makes it possible to warm the electricity storage device by driving the air conditioning unit.

Further, in this case, an inlet, through which heating air sent from the air conditioning unit is sent to the electricity storage device, is preferably provided. This allows the electricity storage device to be efficiently warmed by introducing the heating air into the inlet.

A fourth aspect of the present invention provides a hybrid vehicle having an internal-combustion engine and an electric motor connected to an electricity storage device, and comprising a controller that enables the engagement/disengagement of the transfer of motive power from the electric motor and/or the internal-combustion engine to a driven section through the intermediary of a transmission and the transfer of the motive power between the electric motor and the internal-combustion engine, and a temperature sensor which detects or estimates the temperature of the electricity storage device, wherein the transmission comprises a first transmission group, which is capable of transferring the motive power from the electric motor and/or the internal-combustion engine to the driven section and which includes a plurality of transmission stages having different transmission ratios, and a second transmission group capable of transferring the motive power from the internal-combustion engine to the driven section, and the controller controls the SOC of the electricity storage device to an intermediate range by shifting a gear by the second transmission group in the case where a temperature state is a low temperature state, in which the temperature detected or estimated by the temperature sensor is below a first predetermined temperature, or a high temperature state, in which the temperature is equal to or higher than a second predetermined temperature, which is higher than the first predetermined temperature, and the SOC of the electricity storage device is in a range that is higher or lower than the intermediate range.

In the hybrid vehicle according to the fourth aspect of the present invention, the controller shifts the gear by the second transmission group and carries out control such that the SOC of the electricity storage device falls in an intermediate range (e.g., 50%) in the case where the temperature detected or estimated by the temperature sensor is below the first predetermined temperature (the low temperature state) or equal to or higher than the second predetermined temperature (the high temperature state) and the SOC of the electricity storage device is higher or lower than the intermediate range (the deviation from an intermediate value being large).

In general, an electricity storage device mounted in a hybrid vehicle has a characteristic in that the assist output (the amount of discharge) decreases and the regenerative output (the amount of discharge) increases as the SOC (state of charge) decreases, while the assist output increases and the regenerative output decreases as the SOC increases.

Hence, controlling the SOC of the electricity storage device to the intermediate range by the controller in accordance with the present invention as described above sets the output of the electricity storage device to be an output that would be obtained when the SOC lies in the intermediate range regardless of whether the electricity storage device is in the low temperature state or the high temperature state. This reduces the time required to effect a downshift or an upshift from a predetermined transmission stage at the time of gear shifting to relatively short time, thus making it possible to restrain a delay in the gear shifting.

The present invention, therefore, provides a hybrid vehicle that restrains the deterioration in the gear shift responsiveness, i.e., the deterioration in the driveability, regardless of whether the temperature is low or high.

Further, the gear shifting is accomplished by the second transmission group, which enables the transmission of the motive power from the internal-combustion engine to the driven section, thus making it possible to restrain the delay in the gear shifting regardless of the output of the electricity storage device.

In this case, the controller preferably specifies a transmission stage of the first transmission group according to the SOC of the electricity storage device. This arrangement makes it possible to set a transmission stage of the first transmission group on the basis of the SOC of the electricity storage device even during a travel at a transmission stage of the second transmission group.

In the hybrid vehicle according to the fourth aspect of the present invention described above, the lower the temperature, the more promptly the controller preferably changes the SOC of the electricity storage device to an intermediate range in the low temperature state. With this arrangement, in coping with the fact that the output of the electricity storage device decreases as the temperature decreases, the SOC is shifted more quickly to the intermediate range when the temperature is extremely low, thus allowing the delay in gear shifting to be restrained.

Further, in the hybrid vehicle according to the fourth aspect of the present invention, the controller preferably controls the charge/discharge of the electricity storage device such that the heat generation in the electricity storage device is accelerated. This arrangement allows the drop in the output to be restrained by raising the temperature of the electricity storage device, thereby making it possible to restrain the delay in changing the speed.

Further, in the hybrid vehicle according to the fourth aspect of the present invention, the controller preferably allows the SOC of the electricity storage device to be changed into a range that is higher than the intermediate range in the case where the transmission stage of the transmission is a maximum stage. With this arrangement, in the case where the transmission stage can be set to a maximum stage, gear shifting can be effected by a normal control rule by shifting the SOC of the electricity storage device into a high range.

In the hybrid vehicle according to the fourth aspect of the present invention, the controller preferably allows the SOC of the electricity storage device to be changed into a range that is lower than the intermediate range in the case where the transmission stage of the transmission is a minimum stage. With this arrangement, in the case where the transmission stage can be set to a minimum stage, gear shifting can be effected by a normal control rule by shifting the SOC of the electricity storage device into a low range.

BRIEF DESCRIPTION OF THE DRAWINGS

FIG. 4(a) is a see-through perspective view of the hybrid vehicle; FIG. 4(b) is a perspective view of the battery and an air passage; and FIG. 4(c) is a perspective view of the battery and a PDU.

FIG. 6(a) illustrates an assist output (the amount of discharge) and FIG. 6(b) illustrates a regenerative output (the amount of charge).

FIG. 19(a) illustrates the rotational speed of an engine; FIG. 19(b) illustrates charge/discharge amounts of a battery; and FIG. 19(c) illustrates the charge/discharge amounts of a battery of a hybrid vehicle of a comparative example.

MODE FOR CARRYING OUT THE INVENTION

[First Embodiment]

A hybrid vehicle according to a first embodiment of the present invention will be described. First, the configuration of the hybrid vehicle according to the first embodiment will be described.

Figure 1:
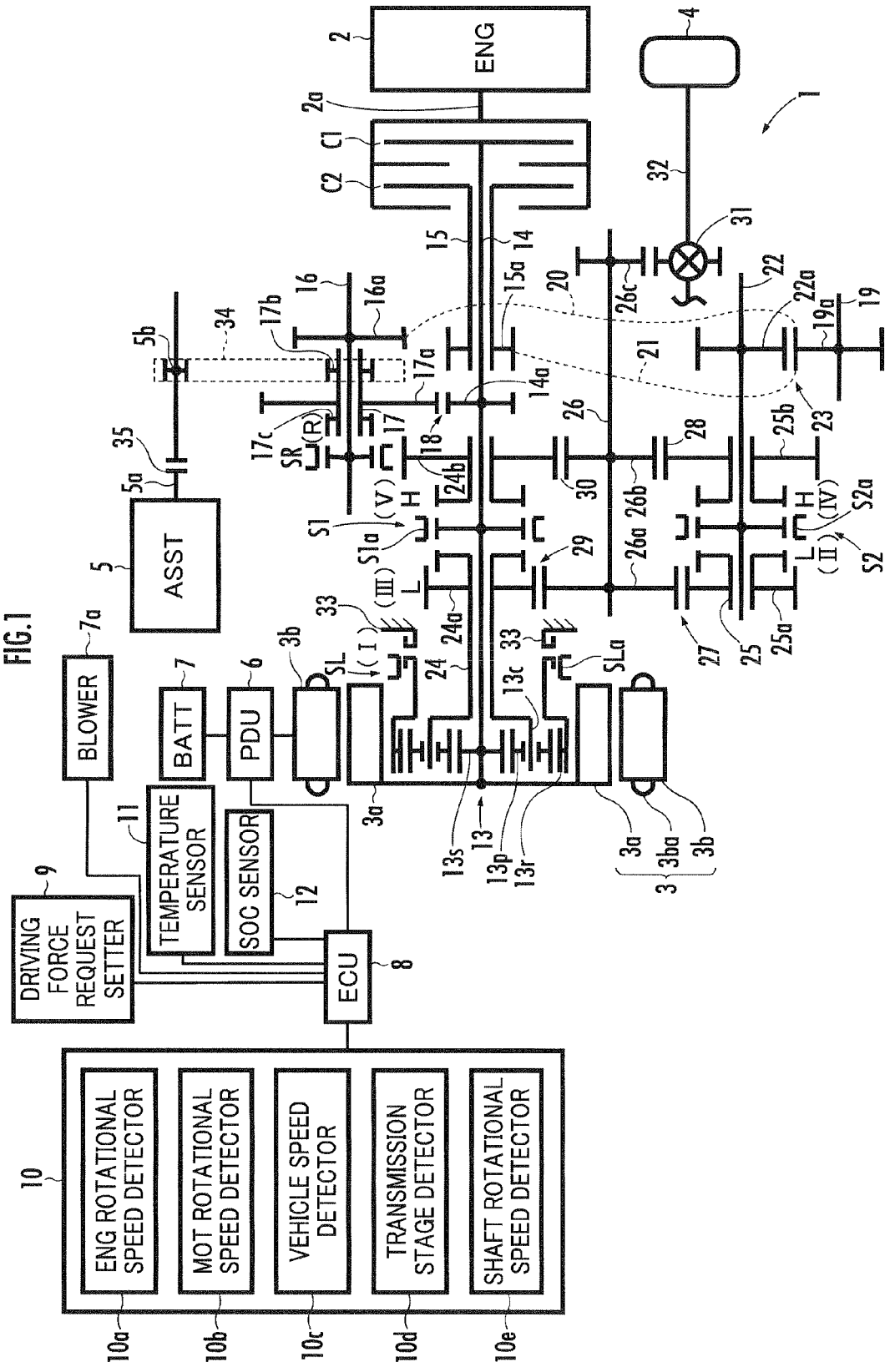
FIG. 1 is a configuration diagram of a hybrid vehicle according to a first embodiment of the present invention.

As illustrated in FIG. 1, the hybrid vehicle according to the first embodiment is provided with a motive power transmitting system 1 and also has an engine 2 as a motive power generating source and an electric motor (motor-generator) 3 capable of starting the engine 2. The engine 2 corresponds to the internal-combustion engine in the present invention.

The motive power transmitting system 1 transmits the motive power (driving power) of the engine 2 and/or the electric motor 3 to drive wheels 4, which are driven parts, and is constructed to be capable of driving the drive wheels 4. Further, the motive power transmitting system 1 transmits the motive power from the engine 2 and/or the motive power from the drive wheels 4 to the electric motor 3 and is constructed to be capable of being regeneratively operated by the electric motor 3. The motive power transmitting system 1 is also constructed to be capable of driving an assist device 5 mounted in the vehicle by the motive power of the engine 2 and/or the electric motor 3. The assist device 5 is, for example, the compressor of an air conditioning unit (air conditioner), a water pump or an oil pump.

The engine 2 is, for example, an internal-combustion engine that generates a motive power (torque) by burning a fuel, such as gasoline, light oil or alcohol. The engine 2 has a driving force input shaft 2a for inputting a generated motive power into the motive power transmitting system 1. As with a standard automobile engine, the engine 2 is controlled by controlling the opening degree of a throttle valve provided in an intake passage not shown (controlling the air intake volume of the engine 2) to adjust the motive power generated by the engine.

The electric motor 3 is a three-phase DC brushless motor in the first embodiment. The electric motor 3 has a hollow rotor (rotating body) 3a rotatably supported in a housing and a stator (stator) 3b. The rotor 3a in the first embodiment is provided with a plurality of permanent magnets. The stator 3b is wrapped with coils for the three phases (armature windings) 3ba. The stator 3b is secured to a housing provided on an immovable portion that is stationary with respect to a vehicle body, such as an exterior case of the motive power transmitting system 1.

The coil 3ba is electrically connected to a battery (an electricity storage device or a secondary cell) 7, which serves as a DC power source, through the intermediary of a power drive unit (hereinafter referred to as the "PDU") 6, which is a drive circuit including an inverter circuit. Further, the PDU 6 is electrically connected to an electronic control unit (hereinafter referred to as the "ECU") 8.

The ECU 8 is electrically connected to constituent elements of the vehicle, such as the motive power transmitting system 1, the engine 2 and the electric motor 3, in addition to the PDU 6. The ECU 8 corresponds to the controller in the present invention. The ECU 8 in the first embodiment is an electronic circuit unit which includes a CPU (Central processing unit), a RAM (Random access memory), a ROM (Read only memory), an interface circuit and the like, and carries out control processing specified by a program thereby to control the motive power transmitting system 1, the engine 2, the electric motor 3 and the like.

Figure 2:
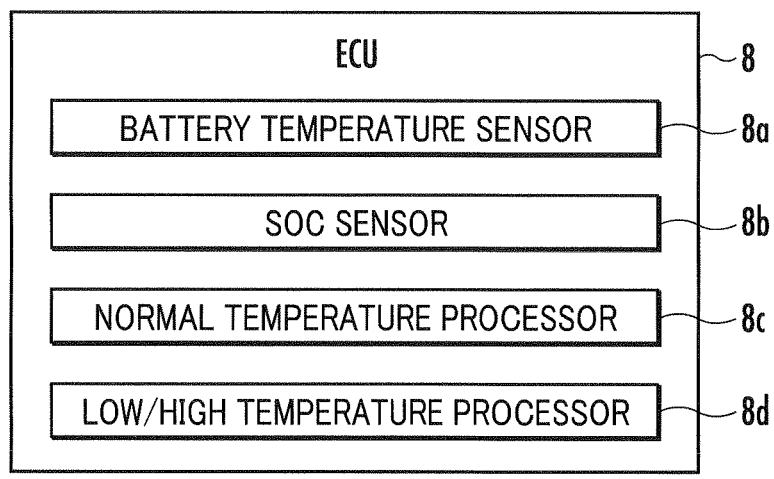
FIG. 2 is a functional block diagram of an ECU of the hybrid vehicle according to the first embodiment of the present invention.

The ECU 8 has, as the means for implementing the functions in the present invention, a battery temperature sensor 8a, a SOC sensor 8b, a normal temperature processor 8c, and a low/high temperature processor 8d, as illustrated in FIG. 2. The functions of the ECU 8 will be described later.

The ECU 8 carries out control processing to control mainly the function for controlling the operation of the engine 2 through the intermediary of an actuator for controlling the engine, such as an actuator for the throttle valve not shown, the function for controlling the operations of various clutches and the sleeves of various synchronizers, which will be discussed later, through the intermediary of actuators or drive circuits not shown, and the function which receives signals from a driving force setter 9, which sets a driving force required of the drive wheels 4 on the basis of a vehicle speed, the rotational speed of the engine 2 or the like, and controls the constituent elements on the basis of the required driving force or a traveling state.

Further, the ECU 8 has a control map which establishes a first, a second, and a third control patterns for controlling the outputs of the electric motor 3 and the engine 2, corresponding to a low temperature state in which the temperature detected (or estimated) by the temperature sensor 8a is below a first predetermined temperature, a high temperature state in which the detected temperature is equal to or higher than a second predetermined temperature, which is higher than the first predetermined temperature, and a normal state in which the detected temperature is neither of the above temperatures. An operation program for carrying out control based on a control map, in which the third control pattern corresponding to the normal state has been switched to the first or the second control pattern, in the aforesaid low temperature state or the high temperature state is stored in a storage (memory).

Further, the ECU 8 controls, via the PDU 6, the current passing through the coil 3ba thereby to adjust the motive power (torque) output by the electric motor 3 from the rotor 3a. In this case, the PDU 6 is controlled to cause the electric motor 3 to perform a powered operation in which a power running torque is generated in the rotor 3a by the electric power supplied from the battery 7, thus functioning as a motor. In other words, the electric power supplied to the stator 3b is converted into the motive power by the rotor 3a and output. Further, the PDU 6 is controlled to cause the electric motor 3 to generate electricity by the rotational energy supplied to the rotor 3a and carries out a regenerative operation so as to produce a regenerative torque in the rotor 3a while charging the battery 7. This means that the electric motor 3 functions also as a generator. In other words, the motive power input to the rotor 3a is converted into electric power by the stator 3b.

The driving force setter 9 is capable of setting a driving force required of the drive wheels 4 according to, for example, the operation by a driver or a traveling state. The driving force setter 9 may use, for example, an acceleration sensor which is provided in an accelerator pedal and which detects the amount of depression of the accelerator pedal or a throttle opening degree sensor which detects the opening degree of a throttle.

Various sensors 10 include, for example, an engine rotational speed detector 10a, which detects the rotational speed of the engine 2, an electric motor rotational speed detector 10b, which detects the rotational speed of the electric motor 3, a vehicle speed detector 10c which detects the speed of a vehicle, a transmission stage detector 10d, which detects the transmission stage of the transmission of the motive power transmitting system 1, and a shaft rotational speed detector 10e, which detects the rotational speed of a motive power transmission shaft, and send signals indicative of detection results of the detectors (sensors) to the ECU 8.

A battery temperature sensor 11 detects the temperature of the battery 7 (battery temperature) and sends the signal indicating the detection result to the ECU 8.

A SOC sensor 12 detects the SOC of the battery 7 and sends the signal indicating the detection result to the ECU 8. The SOC takes a value within the range of 0% to 100%.

The constituent elements of the motive power transmitting system 1 in the first embodiment will now be described. The motive power transmitting system 1 has a motive power combining mechanism 13, which combines the motive power of the engine 2 and the motive power of the electric motor 3. As the motive power combining mechanism 13, a planetary gear device is adopted in the first embodiment. The motive power combining mechanism 13 will be discussed hereinafter.

A first main input shaft 14 is connected to the driving force input shaft 2a of the engine 2. The first main input shaft 14 is disposed in parallel to the driving force input shaft 2a and receives the motive power from the engine 2 through the intermediary of a first clutch C1. The first main input shaft 14 extends to the electric motor 3 from the engine 2. The first main input shaft 14 is configured such that it can be connected or disconnected to or from the driving force input shaft 2a of the engine 2 by the first clutch C1. Further, the first main input shaft 14 in the first embodiment is connected to the rotor 3a of the electric motor 3.

The first clutch C1 is controlled by the ECU 8 to connect or disconnect the driving force input shaft 2a and the first main input shaft 14. When the driving force input shaft 2a and the first main input shaft 14 are connected by the first clutch C1, the motive power can be transmitted between the driving force input shaft 2a and the first main input shaft 14. When the driving force input shaft 2a and the first main input shaft 14 are disconnected by the first clutch C1, the motive power transmitted between the driving force input shaft 2a and the first main input shaft 14 is cut off.

A first auxiliary input shaft 15 is disposed concentrically with respect to the first main input shaft 14. The first auxiliary input shaft 15 receives the motive power from the engine 2 through the intermediary of a second clutch C2. The second clutch C2 is controlled by the ECU 8 to connect or disconnect the driving force input shaft 2a and the first auxiliary input shaft 15. When the driving force input shaft 2a and the first auxiliary input shaft 15 are connected by the second clutch C2, the motive power can be transmitted between the driving force input shaft 2a and the first auxiliary input shaft 15. When the driving force input shaft 2a and the first auxiliary input shaft 15 are disconnected by the second clutch C2, the motive power transmitted between the driving force input shaft 2a and the first auxiliary input shaft 15 is cut off. The first clutch C1 and the second clutch C2 are adjacently disposed in the direction of the axial center of the first main input shaft 14. The first clutch C1 and the second clutch C2 in the first embodiment are composed of multiplate wet clutches.

As described above, the motive power transmitting system 1 is configured such that the first clutch C1 disengageably transmits the rotation of the driving force input shaft 2a to the first main input shaft 14 (a first drive gear shaft), while the second clutch C2 disengageably transmits the rotation of the driving force input shaft 2a to a second main input shaft 22 (a second drive gear shaft).

A reverse shaft 16 is disposed in parallel to the first main input shaft 14. A reverse gear shaft 17 is rotatably supported on the reverse shaft 16. The first main input shaft 14 and the reverse gear shaft 17 are connected at all times through the intermediary of a gear train 18. The gear train 18 is configured by a gear 14a fixed on the first main input shaft 14 and a gear 17a provided on the reverse gear shaft 17, which gears are meshed with each other.

The reverse shaft 16 is provided with a reverse synchronizer SR capable of switching between the connection and disconnection between a reverse gear 17c fixed on the reverse gear shaft 17 and the reverse shaft 16.

An intermediate shaft 19 is disposed in parallel to the reverse shaft 16 and the first main input shaft 14. The intermediate shaft 19 and the reverse shaft 16 are connected at all times through the intermediary of a gear train 20. The gear train 20 is constituted by a gear 19a fixed on the intermediate shaft 19 and a gear 16a fixed on the reverse shaft 16, which gears are meshed with each other. The intermediate shaft 19 and the first auxiliary input shaft 15 are connected at all times through the intermediary of a gear train 21. The gear train 21 is constituted by a gear 19a fixed on the intermediate shaft 19 and a gear 15a fixed on the first auxiliary input shaft 15, which gears are meshed with each other.

A second main input shaft 22 is disposed in parallel to the intermediate shaft 19 and the first main input shaft 14. The second main input shaft 22 and the intermediate shaft 19 are connected at all times through the intermediary of a gear train 23. The gear train 23 is composed of a gear 19a fixed on the intermediate shaft 19 and a gear 22a fixed on the second main input shaft 22, which gears are meshed with each other.

The first main input shaft 14 rotatably supports the drive gear of each gear train of an odd-numbered or an even-numbered transmission stage in terms of the order of transmission ratio among a plurality of transmission stages having different transmission ratios (odd-numbered transmission stages, namely, a 3rd-speed stage and a 5th-speed stage in the first embodiment), and is connected to the electric motor 3. The first main input shaft 14 corresponds to the first drive gear shaft in the present invention.

Specifically, a second auxiliary input shaft 24 is disposed concentrically with the first main input shaft 14. The second auxiliary input shaft 24 is disposed more closely to the electric motor 3 than the first auxiliary input shaft 15. The first main input shaft 14 and the second auxiliary input shaft 24 are connected through the intermediary of a first synchronous engaging mechanism S1 (a synchromesh mechanism in the first embodiment). The first synchronous engaging mechanism S1 is provided on the first main input shaft 14 and selectively connects a 3rd-speed gear 24a and a 5th-speed gear 24b to the first main input shaft 14. Specifically, the first synchronous engaging mechanism S1 is a synchro-clutch or the like, which is widely known, and a sleeve S1a is moved in the axial direction of the second auxiliary input shaft 24 by an actuator and a shift fork, not shown, thereby selectively connecting the 3rd-speed gear 24a and the 5th-speed gear 24b to the first main input shaft 14. More specifically, if the sleeve S1a is moved from the neutral position in the drawing toward the 3rd-speed gear 24a, then the 3rd-speed gear 24a and the first main input shaft 14 are connected. Meanwhile, if the sleeve S1a is moved from the neutral position in the drawing toward the 5th-speed gear 24b, then the 5th-speed gear 24b and the first main input shaft 14 are connected.

The second main input shaft 22 rotatably supports the drive gear of each gear train of an even-numbered or odd-numbered transmission stage in terms of the order of transmission ratio among a plurality of transmission stages having different transmission ratios (even-numbered transmission stages, namely, a 2nd-speed stage and a 4th-speed stage in the first embodiment). The second main input shaft 22 corresponds to the second drive gear shaft in the present invention. Specifically, a third auxiliary input shaft 25 is disposed concentrically with the second main shaft 22. The second main input shaft 22 and the third auxiliary input shaft 25 are connected through the intermediary of a second synchronous engaging mechanism S2 (a synchromesh mechanism in the first embodiment). The second synchronous engaging mechanism S2 is provided on the second main input shaft 22 and selectively connects a 2nd-speed gear 25*a* and a 4th-speed gear 25*b* to the second main input shaft 22. The second synchronous engaging mechanism S2 is a synchro-clutch or the like, which is widely known, and a sleeve S2*a* is moved in the axial direction of the third auxiliary input shaft 25 by an actuator and a shift fork, not shown, thereby selectively connecting the 2nd-speed gear 25*a* and the 4th-speed gear 25*b* to the second main input shaft 22. If the sleeve S2*a* is moved from the neutral position in the drawing toward the 2nd-speed gear 25*a*, then the 2nd-speed gear 25*a* and the second main input shaft 22 are connected. Meanwhile, if the sleeve S2*a* is moved from the neutral position in the drawing toward the 4th-speed gear 25*b*, then the 4th-speed gear 25*b* and the second main input shaft 22 are connected.

The third auxiliary input shaft 25 and the output shaft 26 are connected through the intermediary of a 2nd-speed gear train 27. The 2nd-speed gear train 27 is constituted of a gear 25*a* fixed on the third auxiliary input shaft 25 and a gear 26*a* fixed on the output shaft 26, which gears are meshed with each other. Further, the third auxiliary input shaft 25 and the output shaft 26 are connected through the intermediary of a 4th-speed gear train 28. The 4th-speed gear train 28 is constituted of a gear 25*b* fixed on the third auxiliary input shaft 25 and a gear 26*b* fixed on the output shaft 26.

The output shaft 26 and the second auxiliary input shaft 24 are connected through the intermediary of a 3rd-speed gear train 29. The 3rd-speed gear train 29 is constituted of a gear 26*a* fixed on the output shaft 26 and a gear 24*a* fixed on the second auxiliary input shaft 24. Further, the output shaft 26 and the second auxiliary input shaft 24 are connected through the intermediary of a 5th-speed gear train 30. The 5th-speed gear train 30 is constituted of a gear 26*b* fixed on the output shaft 26 and a gear 24*b* fixed on the second auxiliary input shaft 24. The gears 26*a* and 26*b* of the gear trains fixed on the output shaft 26 are referred to as driven gears.

Further, a final gear 26*c* is fixed on the output shaft 26. The rotation of the output shaft 26 is transmitted to the drive wheels 4 through the intermediary of the final gear 26*c*, a differential gear unit 31 and an axle 32.

The gear 24*a* and the gear 24*b* mentioned above correspond to a first gearshift group. Further, the gear 25*a* and the gear 25*b* correspond to a second gearshift group. The first gearshift group and the second gearshift group correspond to the transmission.

The motive power combining mechanism 13 in the first embodiment is provided inside the electric motor 3. Some or all of the rotor 3*a*, the stator 3*b* and the coil 3*ba* constituting the electric motor 3 are disposed such that they overlap with the motive power combining mechanism 13 in the direction that is orthogonal to the axial direction of the first main input shaft 14.

The motive power combining mechanism 13 is formed of a differential device capable of differentially rotating a first rotating element, a second rotating element, and a third rotating element. The differential device constituting the motive power combining mechanism 13 in the first embodiment is a single-pinion type planetary gear device concentrically provided with three rotating elements, namely, a sun gear 13*s* (a first rotating element), a ring gear 13*r* (a second rotating element), and a carrier (a third rotating element) 13*c* rotatably supporting a plurality of planetary gears 13*p*, which are sandwiched between the sun gear 13*s* and the ring gear 13*r* and which are meshed with the sun gear 13*s* and the ring gear 13*r*. These three rotating elements 13*s*, 13*r* and 13*c* are capable of mutually transmitting motive power and rotate while maintaining a certain collinear relationship among their numbers of rotations (rotational speeds).

The sun gear 13*s* is secured to the first main input shaft 14 such that it rotates in conjunction with the first main input shaft 14. The sun gear 13*s* is also secured to the rotor 3*a* such that it rotates in conjunction with the rotor 3*a* of the electric motor 3. Thus, the sun gear 13*s*, the first main input shaft 14, and the rotor 3*a* rotate in conjunction with each other.

The ring gear 13*r* is configured such that it can be switched between a state wherein it is secured to a housing 33, which is immovable, and a state wherein it is not fixed, by a third synchronous engaging mechanism SL. More specifically, the ring gear 13*r* is configured such that it can be switched between a state, wherein it is fixed to the housing 33, and a state, wherein it is not fixed, by moving a sleeve SLa of the third synchronous engaging mechanism SL in the direction of the rotational axis of the ring gear 13*r*.

The carrier 13*c* is connected to one end of the second auxiliary input shaft 24, which end is adjacent to the electric motor 3, such that the carrier 13*c* rotates in conjunction with the second auxiliary input shaft 24.

An input shaft 5*a* of the assist device 5 is disposed in parallel to the reverse shaft 16. The reverse shaft 16 and the input shaft 5*a* of the assist device 5 are connected through the intermediary of, for example, a belt mechanism 34. The belt mechanism 34 is formed by a gear 17*b* fixed on the reverse gear shaft 17 and a gear 5*b* fixed on the input shaft 5*a*, which gears are connected through a belt. The input shaft 5*a* of the assist device 5 is provided with an assist device clutch 35. The gear 5*b* and the input shaft 5*a* of the assist device 5 are concentrically connected through the intermediary of the assist device clutch 35.

The assist device clutch 35 is a clutch that acts to connect or disconnect the gear 5*b* and the input shaft 5*a* of the assist device 5 under the control of the ECU 8. In this case, if the assist device clutch 35 is set in a connection mode, then the gear 5*b* and the input shaft 5*a* of the assist device 5 are connected through the intermediary of the assist device clutch 35 such that the gear 5*b* and the input shaft 5*a* rotate together as one piece. If the assist device clutch 35 is placed in a disconnection mode, then the connection between the gear 5*b* and the input shaft 5*a* of the assist device 5 engaged by the assist device clutch 35 is cleared. In this state, the motive power transmitted to the first main input shaft 14 and the input shaft 5*a* of the assist device 5 is cut off.

Each of the transmission stages will now be explained. As described above, the motive power transmitting system 1 in the first embodiment is constructed to change the rotational speed of the input shaft into a plurality of stages through the intermediary of the gear trains of the plurality of transmission stages having different transmission ratios and output the changed speed in the plurality of stages to the output shaft 26. In other words, the motive power transmitting system 1 in the first embodiment has a transmission with shift stages. In the motive power transmitting system 1, as the gear shaft stage increases, the transmission ratios decrease.

At the time of an engine startup, the first clutch C1 is connected and the electric motor 3 is driven to start the engine 2. In other words, the electric motor 3 functions also as a starter.

A 1st-speed stage is established by setting the ring gear 13*r* and the housing 33 in a connected state (fixed state) by the third synchronous engaging mechanism SL. When traveling on the engine 2, the second clutch C2 is set in a cutoff state (hereinafter referred to as the OFF state) and the first clutch C1 is set in a connected state (hereinafter referred to as the ON state). The driving force output from the engine 2 is transmitted to the drive wheels 4 through the intermediary of the sun gear 13s, the carrier 13c, the gear train 29, the output shaft 26 and the like.

Driving the engine 2 and the electric motor 3 permits an assist travel on the electric motor 3 at the 1st-speed stage (a travel mode in which the driving force of the engine 2 is assisted by the electric motor 3). Further, setting the first clutch C1 in the OFF state makes it possible to engage an EV travel mode, in which the vehicle travels on the electric motor 3 alone.

Further, during a deceleration regenerative drive, electricity can be generated by the electric motor 3 by placing the vehicle in a deceleration mode by braking the electric motor 3, thus charging the battery 7 through the intermediary of the PDU 6.

A 2nd-speed stage is established by setting the ring gear 13r and the housing 33 in the non-fixed state by the third synchronous engaging mechanism SL, while setting the second synchronous engaging mechanism S2 in the state wherein the second main input shaft 22 and the 2nd-speed gear 25a are connected. For traveling on the engine 2, the second clutch C2 is set to the ON state. At the 2nd-speed stage, the driving force output from the engine 2 is transmitted to the drive wheels 4 through the intermediary mainly of the first auxiliary input shaft 15, the gear train 21, the intermediate shaft 19, the gear train 23, the second main input shaft 22, the 2nd-speed gear train 27, and the output shaft 26.

With the first clutch C1 set to the ON state, the assist travel by the electric motor 3 at the 2nd-speed stage can be engaged by driving the engine 2 and also driving the electric motor 3. Further, stopping the drive on the engine 2 in this state allows the EV travel to be engaged. In the case where the drive on the engine 2 is stopped, the engine 2 may be set in, for example, a fuel-cut state or a cylinder cutoff state. Further, the deceleration regenerative drive can be accomplished at the 2nd-speed stage.

If the ECU 8 determines that an upshift to the 3rd-speed stage is expected according to the traveling state of the vehicle while the vehicle is traveling at the 2nd-speed stage by driving the engine 2, the first clutch C1 being set in the OFF state and the second clutch C2 being set in the ON state, then a state wherein the first main input shaft 14 and the 3rd-speed gear 24a are connected by the first synchronous engaging mechanism S1 is set or a pre-shift state close thereto is set. This permits smooth upshift from the 2nd-speed stage to the 3rd-speed stage.

A 3rd-speed stage is established by setting the first synchronous engaging mechanism S1 in the state wherein the first main input shaft 14 and the 3rd-speed gear 24a are connected. When the vehicle travels on the engine 2, the first clutch C1 is set to the ON state. At the 3rd-speed stage, the driving force output from the engine 2 is transmitted to the drive wheels 4 through the intermediary mainly of the first main input shaft 14, the 3rd-speed gear train 29, and the output shaft 26.

With the first clutch C1 set to the ON state, the assist travel by the electric motor 3 at the 3rd-speed stage can be engaged by driving the engine 2 and also driving the electric motor 3. Further, the EV travel can be engaged, with the first clutch C1 set to the OFF state. While the vehicle is in the EV travel mode, setting the first clutch C1 to the ON state and stopping the drive on the engine 2 permits the EV travel. Further, the deceleration regenerative drive can be accomplished at the 3rd-speed stage.

While the vehicle is traveling at the 3rd-speed stage, the ECU 8 predicts whether the next transmission stage to be engaged for gear shifting will be the 2nd-speed stage or the 4th-speed stage according to the traveling condition of the vehicle. If the ECU 8 predicts a downshift to the 2nd-speed stage, then the second synchronous engaging mechanism S2 is set to a state wherein the 2nd-speed gear 25a and the second main input shaft 22 are connected or a pre-shift state close thereto is set. If the ECU 8 predicts an upshift to the 4th-speed stage, then the second synchronous engaging mechanism S2 is set to a state wherein the 4th-speed gear 25b and the second main input shaft 22 are connected or a pre-shift state close thereto. This permits smooth upshift and downshift from the 3rd-speed stage.

A 4th-speed stage is established by setting the second synchronous engaging mechanism S2 to the state wherein the second main input shaft 22 and the 4th-speed gear 25b are connected. When the vehicle travels on the engine 2, the second clutch C2 is set to the ON state. At the 4th-speed stage, the driving force output from the engine 2 is transmitted to the drive wheels 4 through the intermediary mainly of the first auxiliary input shaft 15, the gear train 21, the intermediate shaft 19, the gear train 23, the second main input shaft 22, the 4th-speed gear train 28, and the output shaft 26.

With the second clutch C2 set to the ON state and the first clutch C1 set to the ON state, driving the engine 2 and the electric motor 3 permits an assist travel on the electric motor 3 at the 4th-speed stage. Further, the drive on the engine 2 in this state may be interrupted to engage the EV travel.

Further, while the vehicle is traveling at the 4th-speed stage by driving the engine 2, with the first clutch C1 set to the OFF state and the second clutch C2 set to the ON state, the ECU 8 predicts whether the next transmission stage to be engaged for gear shifting will be the 3rd-speed stage or a 5th-speed stage. If the ECU 8 predicts a downshift to the 3rd-speed stage, then the state wherein the first main input shaft 14 and the 3rd-speed gear 24a are connected or a pre-shift close thereto is set by the first synchronous engaging mechanism S1. If the ECU 8 predicts an upshift to the 5th-speed stage, then the state wherein the first main input shaft 14 and the 5th-speed gear 24b are connected or a pre-shift close thereto is set by the first synchronous engaging mechanism S1. This permits smooth upshift and downshift from the 4th-speed stage.

The 5th-speed stage is established by setting the first synchronous engaging mechanism S1 to the state wherein the first main input shaft 14 and the 5th-speed gear 24b are connected. For traveling on the engine 2, the first clutch C1 is set to the ON state. At the 5th-speed stage, the driving force output from the engine 2 is transmitted to the drive wheels 4 through the intermediary mainly of the first main input shaft 14, the 5th-speed gear train 30, and the output shaft 26.

With the first clutch C1 set to the ON state, the assist travel by the electric motor 3 at the 5th-speed stage can be engaged by driving the engine 2 and also driving the electric motor 3. Further, the EV travel can be engaged, with the first clutch C1 being set to the OFF state. Further, with the first clutch C1 set to the ON state, the EV travel can be engaged, the drive on the engine 2 being stopped. In addition, the deceleration regenerative drive can be accomplished at the 5th-speed stage.

If the ECU 8 determines that the next transmission stage to be engaged for gear shifting will be the fourth-speed stage according to the traveling state of the vehicle while the vehicle is traveling at the 5th-speed stage, then the ECU 8 sets the second synchronous engaging mechanism S2 to a state wherein the 4th-speed gear 25b and the second main input shaft 22 are connected or a pre-shift state close thereto. This permits smooth downshift from the 5th-speed stage to the 4th-speed stage.

The reverse stage is established by setting a reverse synchronous engaging mechanism SR to a state wherein the reverse shaft 16 and the reverse gear 17c are connected and by setting the second synchronous engaging mechanism S2 to a state wherein, for example, the second main input shaft 22 and the 2nd-speed gear 25a are connected. When traveling on the engine 2, the first clutch C1 is set to the ON state. At the reverse stage, the driving force output from the engine 2 is transmitted to the drive wheels 4 through the intermediary mainly of the first main input shaft 14, the gear train 18, the reverse gear 17c, the reverse shaft 16, the gear train 20, the intermediate shaft 19, the gear train 23, the second main input shaft 22, the third auxiliary input shaft 25, the gear train 27, and the output shaft 26. Driving the engine 2 and also driving the electric motor 3 permits the assist travel by the electric motor 3 at the reverse stage. Further, the EV travel can be engaged by setting the first clutch C1 to the OFF state. In addition, the deceleration regenerative drive can be accomplished at the 5th-speed stage.

Figure 3:
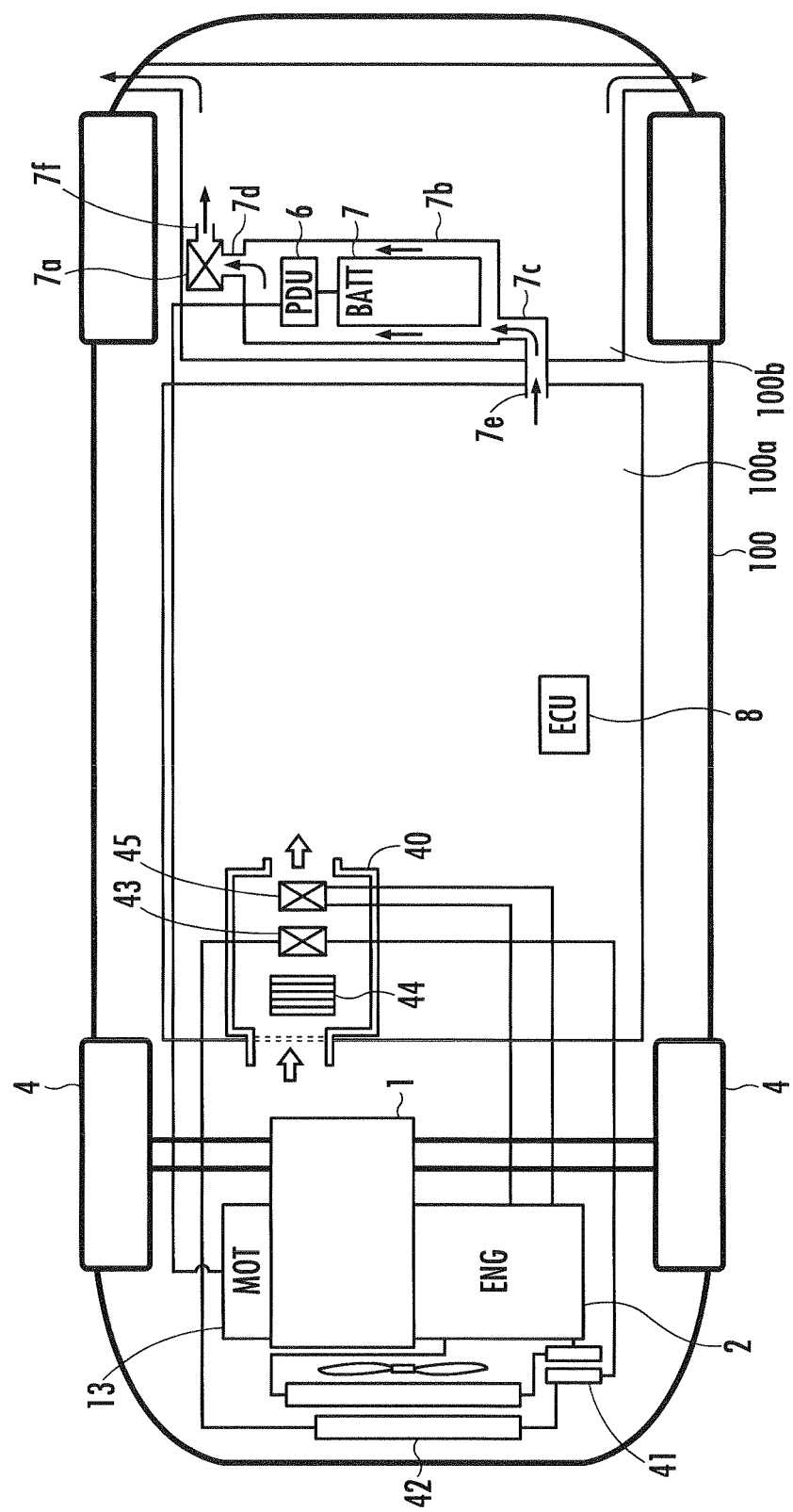
FIG. 3 is a general configuration diagram of the hybrid vehicle According to the first embodiment of the present invention.
Figure 4:
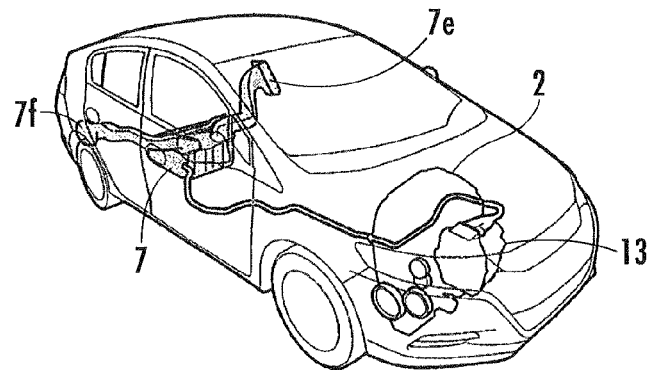
FIG. 4 is a diagram illustrating the disposition of a battery in the hybrid vehicle according to the first embodiment of the present invention.
Figure 4:
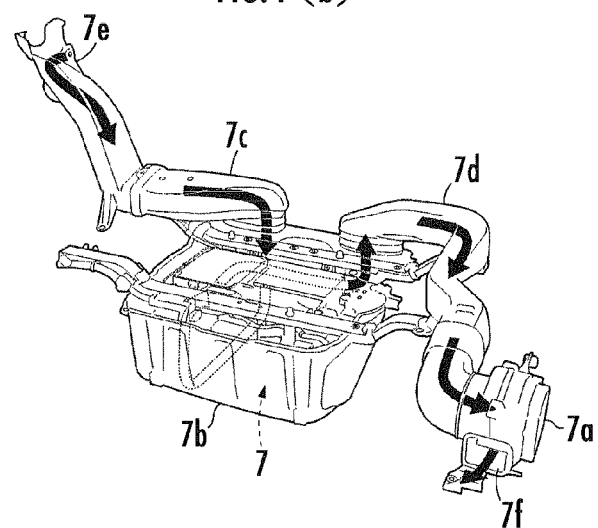
Figure 4:
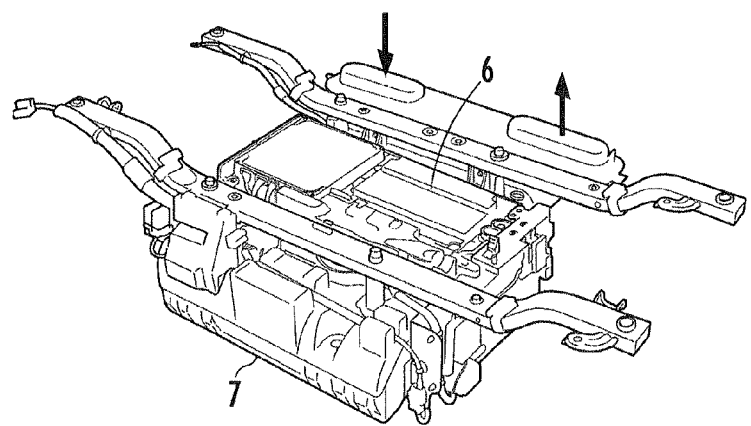

Referring now to FIG. 3 and FIG. 4, the temperature control of the hybrid vehicle according to the first embodiment will be described. A hybrid vehicle 100 according to the first embodiment has an air conditioner 40. As the air conditioner 40, a heat pump type, for example, may be adopted. The air conditioner 40 has a compressor 41, an exterior heat exchanger 42, an interior heat exchanger 43, and a blower (fan) 44. The compressor 41, the exterior heat exchanger 42 and the interior heat exchanger 43 are connected by a refrigerant passage. The air conditioner 40 is configured such that, when the compressor 41 is driven under the control of the ECU 8, a refrigerant circulates through the exterior heat exchanger 42 and the interior heat exchanger 43 via the refrigerant passage so as to allow the air temperature in the vehicle compartment to be adjusted, that is, to permit switching between heating and cooling. For the heating, a heater core 45 that utilizes the heat from the cooling water of the engine 2 may be used to warm the air in a vehicle compartment 100a.

In the compressor 41 as the assist device 5, belt mechanism 34 is formed by the gear 17b fixed on the reverse gear shaft 17 and the gear 5b fixed on the input shaft 5a, which gears are connected through the belt, as described above. The compressor 41 is configured to be rotatably driven through the intermediary of the first main input shaft 14 by the electric motor 3 or the engine 2.

The battery 7 is provided with a blower 7a for blowing the air in the vehicle compartment 100a to a battery main body. More specifically, according to the first embodiment, the battery 7 and the PDU 6 are installed in a trunk 100b provided at the rear of the vehicle. The battery 7 and the PDU 6 are held in a holding container 7b serving as a heat sink. The holding container 7b is provided with a first ventilation passage 7c in communication with the vehicle compartment 100a and a second ventilation passage 7d in communication with the trunk 100b. The second ventilation passage is provided with the blower 7a.

If, for example, a battery temperature control condition is satisfied, then the ECU 8 drives the compressor 41 serving as the assist device 5 to warm or cool the vehicle compartment 100a by the air conditioner 40 and also drives the blower 7a. The pressure in the first ventilation passage 7c and the holding container 7b becomes a negative pressure relative to the vehicle compartment 100a, causing the air in the vehicle compartment 100a to be blown to the main body of the battery 7 through the first ventilation passage 7c from an air inlet 7e. Thus, the battery 7 is heated or cooled. The air in the holding container 7b is sent into the trunk 100b from an exhaust port 7f through the second ventilation passage 7d by the blower 7a.

The functions of the ECU 8 illustrated in FIG. 2 will now be described.

The battery temperature sensor 8a detects the temperature of the battery 7 on the basis of a signal indicative of the temperature of the battery 7 received from the temperature sensor 11. The battery temperature sensor 8a may detect the temperature of the battery 7 by estimating the temperature of the battery 7 by calculation on the basis of, for example, the charge/discharge amounts, the initial value, or the full charge amount (full charging capacity) of the battery 7.

The SOC sensor 8b detects the SOC of the battery 7 on the basis of a signal, which indicates the state of charge (SOC) of the battery 7, received from the SOC sensor 12. The SOC sensor 8b may detect the SOC by estimating the SOC of the battery 7 by calculation based on, for example, the charge/discharge amounts or the initial value of the battery 7.

Figure 5:
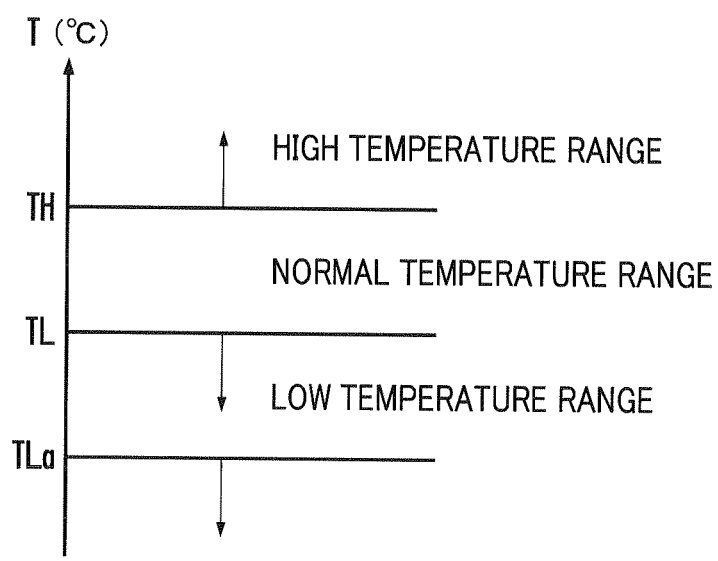
FIG. 5 is a diagram illustrating the normal temperature, the low temperature and the high temperature of the battery of the hybrid vehicle according to the first embodiment of the present invention.

The normal temperature processor 8c controls each of the constituent elements of the vehicle in a normal temperature travel mode in the case where the temperature of the battery 7 is in a normal temperature range. As illustrated in FIG. 5, the normal temperature range according to the first embodiment is a range from a first predetermined temperature TL or higher to a temperature below a second predetermined temperature TH. The high-temperature range of the battery 7 is the second predetermined temperature TH or higher. The low-temperature range of the battery 7 is below the first predetermined temperature TL. The ECU 8 according to the first embodiment carries out control to restrict or prohibit the output (charge/discharge) of the battery 7 if the temperature of the battery 7 is extremely low, namely, below a third predetermined temperature TLa, which is lower than the first predetermined temperature TL, or if the temperature thereof is high.

If the temperature of the battery 7 detected by the temperature sensor 8a is below the first predetermined temperature TL or the second predetermined temperature TH, which is higher than the first predetermined temperature TL, or more, then the low/high temperature processor 8d carries out processing according to the temperature of the battery 7, namely, low temperature or high temperature. The function of the low/high temperature processor 8d will be described hereinafter.

Figure 6:
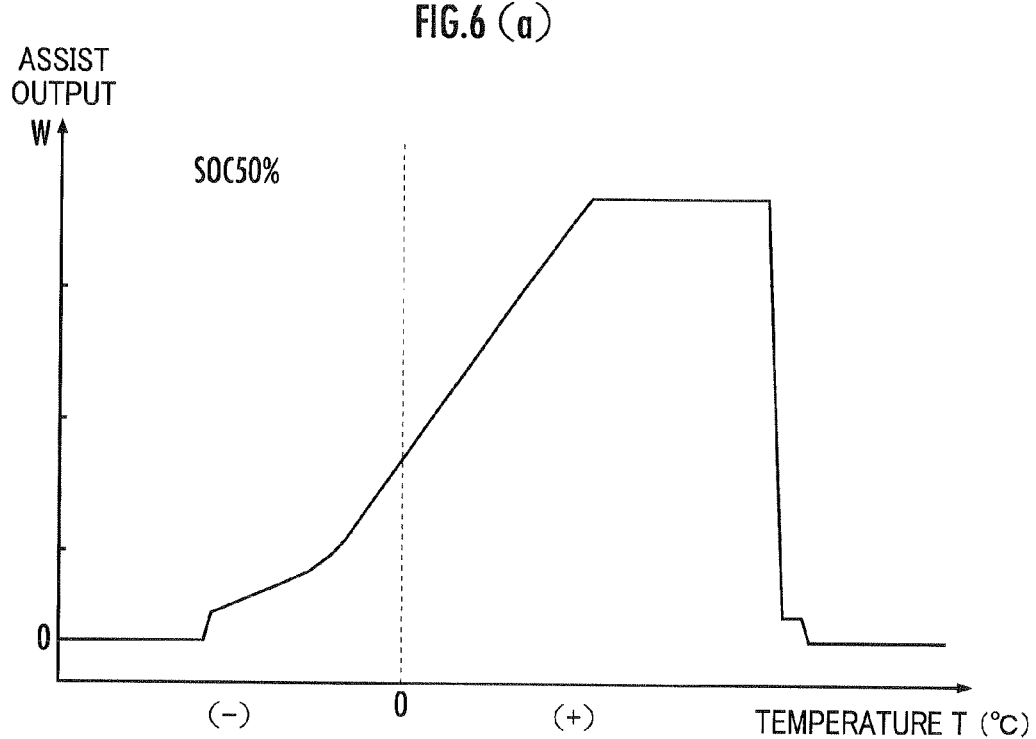
FIG. 6 shows charts of outputs of a battery, the SOC of which is 50%.
Figure 6:
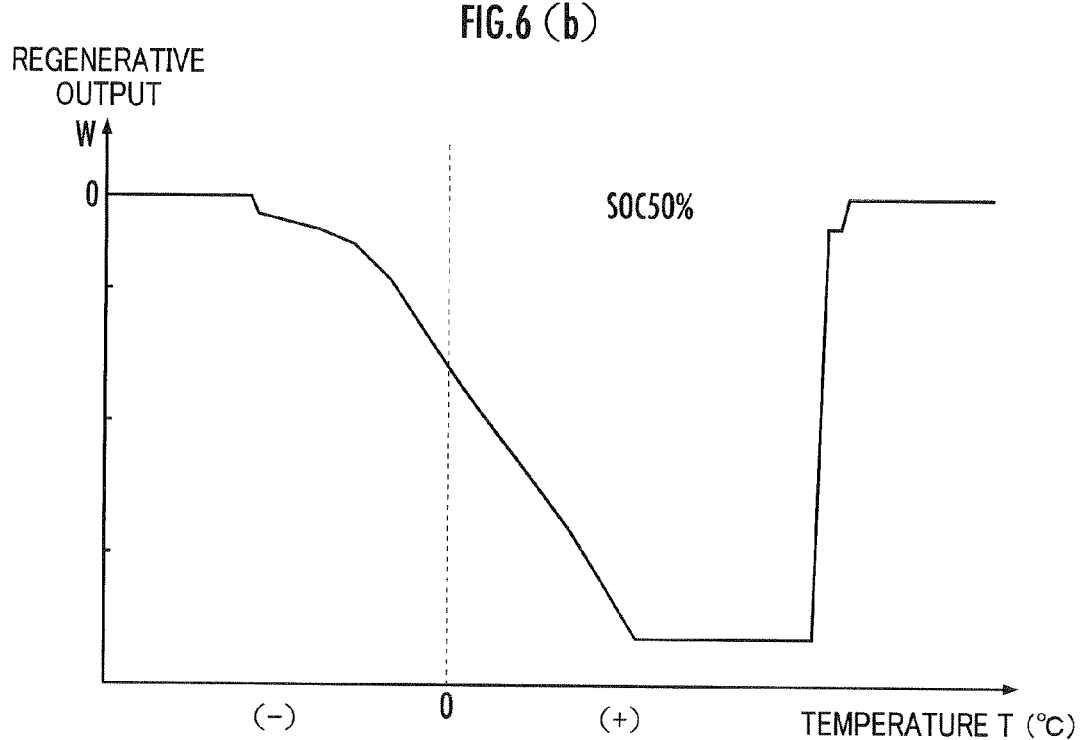

Referring now to FIG. 6, the temperature-dependent changes of the outputs, namely, an assist output (W) and a regenerative output (W), of the battery 7 of the hybrid vehicle according to the first embodiment will be described. The SOC of the battery 7 is set to 50%. Of the charge/discharge amounts of the battery 7, a discharge current amount corresponds to the assist output, while a charge current amount corresponds to the regenerative output.

According to the first embodiment, the assist output of the battery 7 indicates a maximum value when the temperature of the battery 7 is in a temperature range in the vicinity of the high temperature range, while the assist output decreases as the temperature decreases in a temperature range that is lower than that. The regenerative output of the battery indicates a minimum value when the temperature of the battery 7 is in the temperature range in the vicinity of the high temperature range, while the regenerative output increases as the temperature decreases in a temperature range that is lower than that.

The ECU 8 carries out control to restrict or prohibit the charge/discharge of the battery 7 when the temperature of the battery 7 is the second predetermined temperature TH or higher. Further, the ECU 8 carries out control to restrict or prohibit the charge/discharge of the current of the battery 7 when the temperature of the battery 7 is an extremely low temperature of the third predetermined temperature TLa or lower. The charge/discharge of the battery 7 is restricted or prohibited when the temperature is high or low, thereby reducing the load on the battery 7.

Figure 7:
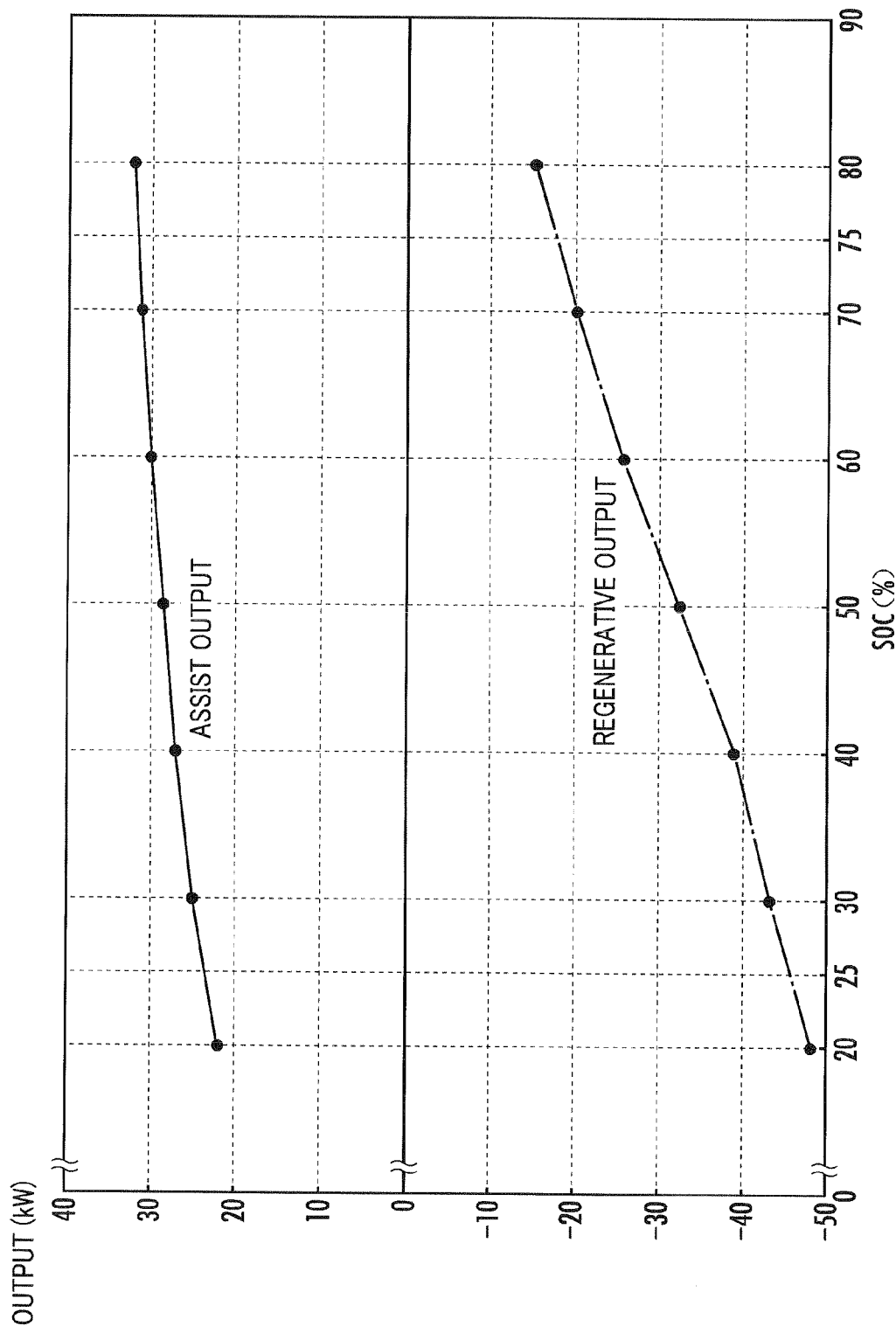
FIG. 7 is a chart illustrating the assist output (the amount of discharge) and the regenerative output (the amount of charge) of the battery at a temperature of 25° C.

Referring now to FIG. 7, the description will be given of the assist output and the regenerative output of the battery 7 when the SOC of the battery 7 in the first embodiment changes. The temperature of the battery 7 is set to the normal temperature range. In the battery 7 according to the first embodiment, as the SOC increases, the assist output of the battery 7 increases, whereas the regenerative output of the battery 7 decreases (the absolute value of the regenerative output deceases). Further, in the battery 7, as the SOC decreases, the assist output of the battery 7 decreases, while the regenerative output of the battery 7 increases (the absolute value of the regenerative output increases). In the case where the SOC is 50%, the assist output and the regenerative output of the battery 7 take substantially middle values between SOC of 25% and SOC of 75%. The characteristics of the assist output and the regenerative output of the battery 7 remain substantially the same whether the temperature of the battery 7 is low or high.

Figure 8:
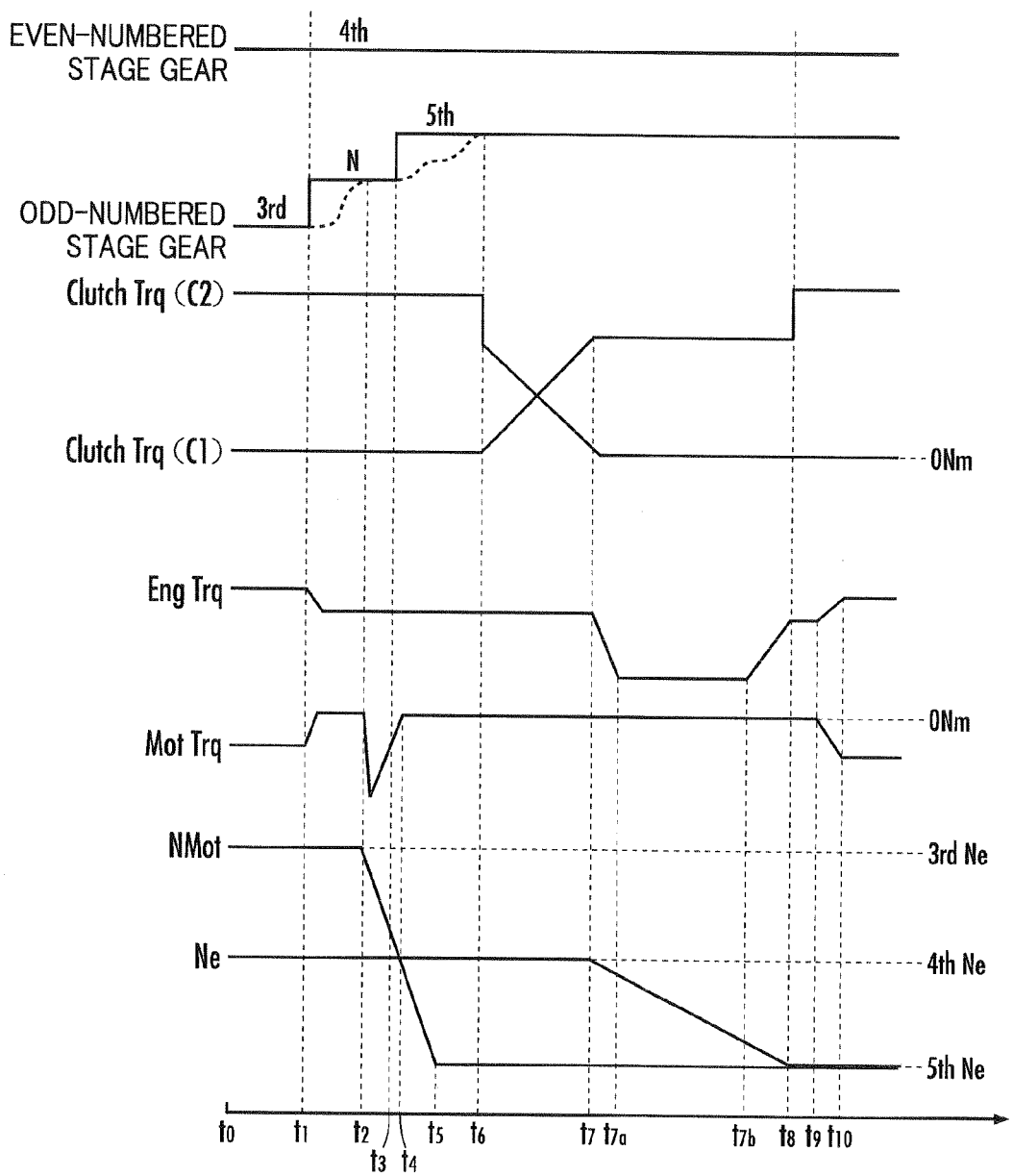
FIG. 8 is a chart illustrating the operation when changing the speed of the hybrid vehicle according to the first embodiment of the present invention.

Referring now to FIG. 8, the time required for changing the speed of the hybrid vehicle according to the first embodiment will be described. More specifically, the description will be given of the time required for the transmission to accomplish gear shifting (pre-shift) from an even-numbered stage to an odd-numbered stage. The following operation will be performed under the control of the ECU 8.

The time required for the aforesaid gear shifting is the time obtained by adding (1) the time required to disengage the sleeve of a synchronous engaging mechanism from a currently selected even-numbered gear stage, (2) the time required for the rotational speeds of the electric motor 3, the transmission and rotating members, such as the motive power transmission shaft, to reach the rotational speed corresponding to the target gear stage (hereinafter referred to as the rotational adjustment time), and (3) the time required to engage the sleeve of the synchronous engaging mechanism with the target odd-numbered gear stage.

As illustrated in FIG. 8, at time t0, the second clutch C2 is in the connected state, and the vehicle is traveling at the 4th-speed stage (an even-numbered stage) by driving the engine. At this time, in the second clutch C2, a torque of a predetermined magnitude Clutch Trq (C2) is being generated. The first clutch C1 is in the disconnected state and therefore the torque of the first clutch C1 denoted by Clutch Trq is 0 (Nm). The 3rd-speed stage has been selected on the odd-numbered stage side, and the electric motor 3 is rotating at a rotational speed NMot (rpm) corresponding to the 3rd-speed stage.

According to the first embodiment, if it is determined that an upshift to the 5th-speed stage will take place on the basis of the traveling condition, the requirement for a driving force or the like while the vehicle is traveling at the 4th-speed stage on the engine drive, then the 5th-speed stage gear 24b and the first main input shaft 14 are connected by the first synchronous engaging mechanism S1.

At time t1, the odd-numbered stage (the 3rd-speed stage) is switched to the neutral gear. More specifically, the gearshift is set to the neutral gear by the first synchronous engaging mechanism S1. Control is carried out to set the drive torque of the electric motor 3 to 0 (Nm).

From time t2 to time t4, the ECU 8 carries out the output control of the drive torque such that the rotational speed of the electric motor 3 at the 3rd-speed stage reaches a target rotational speed of the electric motor 3 at the 5th-speed stage, the first clutch C1 being disconnected and an odd-numbered stage being in the neutral position. The target rotational speed of the electric motor 3 at the 5th-speed stage is smaller than the rotational speed of the electric motor 3 at the 3rd-speed stage. Hence, the ECU 8 performs regenerative control to cut down the rotational speed of the electric motor 3.

According to the first embodiment, when the torque is being output from the aforesaid electric motor 3 (at time t3), the setting is changed from the neutral to the 5th-speed stage at the first main input shaft 14 (pre-upshift). More specifically, the ECU 8 carries out control such that the first main input shaft 14 and the 5th-speed stage gear are fixed by the first synchronous engaging mechanism S1.

At time t5, the electric motor 3 is controlled to reach the rotational speed corresponding to the 5th-speed stage. The time required to adjust the rotational speed of the electric motor 3 (the rotational adjustment time) for the pre-shift for the shift from the 3rd-speed stage to the 5th-speed stage when the vehicle is traveling at an even-numbered stage (the 4th-speed stage) corresponds to the time from time t2 to time t5.

From time t6 to time t7, control is carried out such that the first clutch C1 is engaged, while the second clutch C2 is disengaged. At this time, the first clutch C1 is controlled such that the clutch torque will be approximately 70% (half-clutched) of the clutch torque obtained when the first clutch C1 is fully engaged.

From time t7 to time t8, the ECU 8 controls an engine rotational speed Ne to the rotational speed corresponding to the 5th-speed stage. At this time, from time t7a to time t7b, the amount of supplied fuel is reduced to a small amount for a short time to lower the engine torque for a short time.

At time t8, the first clutch C1 is fully engaged to connect the first main input shaft 14 and the engine 2.

From time t9 to time t10, a predetermined drive torque is output by the electric motor 3 to assist the driving by the engine 2.

As described above, the electric motor 3, the transmission and the rotating members, such as the motive power transmission shaft, have inertial moments. For this reason, the aforesaid rotational adjustment time will be relatively long if the battery output is relatively small when the temperature of the battery 7 is low or high.

Figures 9, 10:
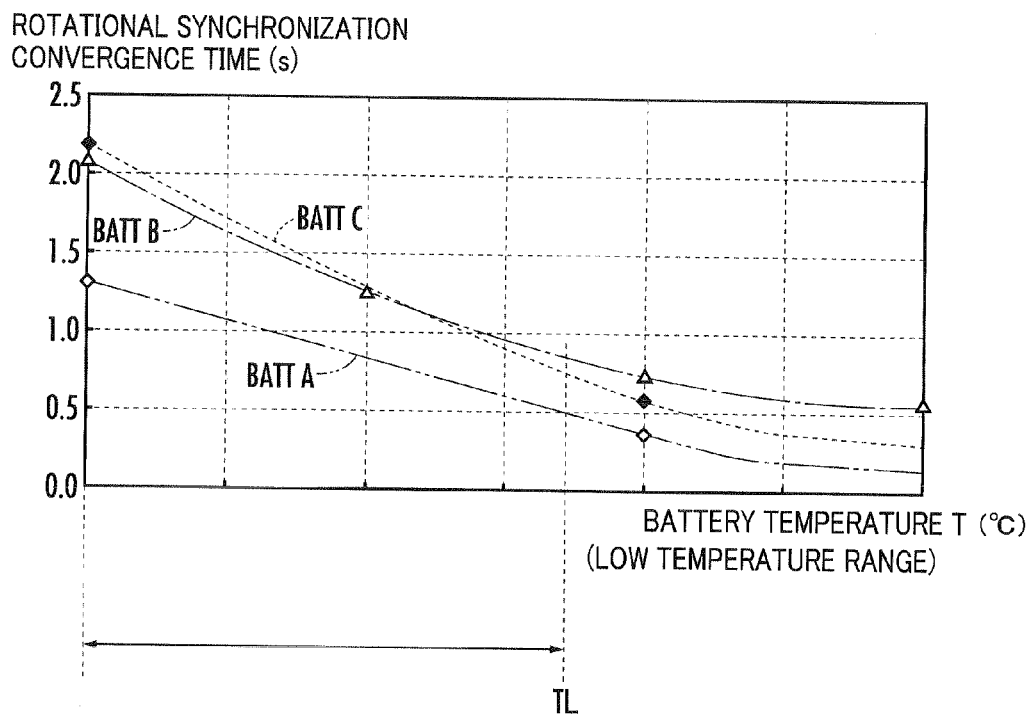
FIG. 9 is a chart illustrating the temperature dependence of the time required for rotational adjustment by a motor when changing the speed of the hybrid vehicle according to the first embodiment of the present invention.
FIG. 10 is a diagram illustrating the time required for gear shifting at a low temperature (a high temperature) and a normal temperature of the hybrid vehicle according to the first embodiment of the present invention.

Referring now to FIG. 9, the description will be given of the time required for the rotational adjustments at battery temperatures when the speed of the hybrid vehicle is changed. More specifically, the time required for the rotational adjustment when the speed is changed from an even-numbered stage to an odd-numbered stage at each battery temperature has been calculated by the computer on the basis mainly of the battery characteristics, the vehicle speed, the rotational speed of the electric motor 3, and the drive performance and the regeneration performance of the electric motor 3.

As the calculation condition, setting has been made such that the rotational speed of the electric motor 3 corresponding to the 3rd-speed stage becomes the rotational speed corresponding to the 5th-speed stage when the SOC of the battery 7 is high, the vehicle speed is in a high-speed range and a shift is made from the 4th-speed stage (in a pre-3rd-speed stage) to the 5th-speed stage. At this time, the rotating members, such as the rotor 3a of the electric motor 3 and the first main input shaft 14, have inertial moments of predetermined magnitudes. Further, the aforesaid rotational adjustment time has been calculated on each of the battery A through battery C representing different types of the battery 7 having different parameters of charge/discharge characteristics.

As described above, as the temperature of the battery 7 decreases, the outputs (the charge/discharge amounts) decrease and the torque (or the counter torque) of the electric motor 3 decreases, resulting in more time required to decelerate the rotational speed of the electric motor 3. The time required for the aforesaid rotational adjustment is preferably predetermined time (e.g., 0.5 sec.) or less in order to secure driveability.

In the case of the batteries B and C, the time required for the aforesaid rotational adjustment is 0.5 sec. or more when the temperatures thereof are in the low temperature range. In the case of the battery A, the required time will be 0.5 sec. when the temperature is the first predetermined temperature TL or less. According to the first embodiment, in order to set the time required for the aforesaid rotational adjustment to the predetermined time (0.5 sec.) or less, the battery temperature control in accordance with the present invention is carried out even when the output of the battery 7 is small in order to prevent the driveability from deteriorating in the case where the temperature thereof is the first predetermined temperature TL or less. Further, when the temperature of the battery 7 is high, even if the output of the battery 7 is small, the control in accordance with the present invention is carried out to prevent the driveability from deteriorating.

Referring now to FIG. 10, the time required for gear shifting when the temperature of the battery 7 is normal, low or high in the hybrid vehicle of the first embodiment will be described.

At the normal temperature, the outputs (the charge/discharge amounts) of the battery 7 are relatively large and the torque or the counter torque of the electric motor 3 is relatively large. The SOCs are 25%, 50%, and 75%, respectively, and the time required for the pre-downshift is 0.1 sec., while the time required for the pre-upshift is 0.1 sec. Hence, the time required for the pre-upshift and the pre-downshift is relatively short, presenting good driveability.

When the temperature of the battery 7 is low (or high), the time required for the pre-downshift is 0.3 sec. and the time required for the pre-upshift is 1.0 sec. in the state wherein the SOC is 75%. In the state wherein the SOC is 50%, the time required for the pre-downshift is 0.5 sec. and the time required for the pre-upshift is 0.5 sec. In the state wherein the SOC is 25%, the time required for the pre-downshift is 1.0 sec. and the time required for the pre-upshift is 0.3 sec.

In other words, when the temperature of the battery 7 is low or high, if the SOC is lower than 50% (e.g., 25%), then the assist output is relatively small, so that the time required for the rotational adjustment of the electric motor 3 at the time of the downshift (the rotational speed of the electric motor 3 is increased at the time of the downshift) is relatively long.

Further, when the temperature of the battery 7 is low or high, if the SOC is higher than 50% (e.g., 75%), then the regenerative output is relatively small, so that the time required for the rotational adjustment of the electric motor 3 at the time of the upshift (the rotational speed of the electric motor 3 is increased at the time of the upshift) is relatively long.

In other words, when the SOC is 75%, the time required for the upshift is relatively long. When the SOC is 25%, the time required for the downshift is relatively long. According to the first embodiment, therefore, when the temperature of the battery 7 is low or high and the outputs (the charge/discharge amounts) of the battery 7 are relatively small, the SOC is set to 50% or in the vicinity of 50% so as to control the time required for the downshift or the upshift to the predetermined time (approximately 0.5 sec.) or less, thereby preventing the driveability from deteriorating.

The function of the low/high temperature processor 8d in the first embodiment will now be described.

The low/high temperature processor 8d specifies an intermediate stage (the 3rd-speed stage in the first embodiment) among the transmission stages of a first transmission group (odd-numbered stages) when the temperature detected by the temperature sensor 8a is below the first predetermined temperature TL or equal to or higher than the second predetermined temperature TH, which is higher than the first predetermined temperature. In other words, according to the first embodiment, the transmission stage is limited to one transmission stage (the 3rd-speed stage) among the aforesaid odd-numbered stages. This makes it possible to prevent the deterioration of the driveability without the need for performing, for example, the operation for adjusting the rotational speed to the one corresponding to a target transmission stage by the electric motor at the time of gear shifting.

Further, in the case where, for example, an upshift or a downshift is to be made from the state in which the intermediate stage (the 3rd-speed stage) of the aforesaid first transmission group (odd-numbered stages) has been selected, setting the transmission stage to an even-numbered stage (the 2nd-speed stage or the 4th-speed stage) provided adjacently to the motive power transmission shaft (the second main input shaft 22) to which the electric motor 3 is not connected makes it possible to obviate the need for the rotational adjustment by the electric motor 3, prevent the deterioration of gear shift responsiveness caused by a drop in the output of the battery, and prevent the deterioration of the driveability.

Further, the low/high temperature processor 8d carries out control to rotate the electric motor 3, enabling the transmission of the motive power from the engine 2 to the drive wheels 4 through the intermediary of the second transmission group (even-numbered stages) and also enabling the transmission of the motive power between the electric motor 3 and the drive wheels 4 through the intermediary of the first transmission group (odd-numbered stages).

Further, if the temperature of the battery 7 is lower than the first predetermined temperature TL, then the low/high temperature processor 8d enables the transmission of the motive power between the electric motor 3 and the engine 2 and carries out control to transmit the motive power from the engine 2 and the electric motor 3 to the drive wheels 4 through the intermediary of the first transmission group (odd-numbered stages).

Figure 11:
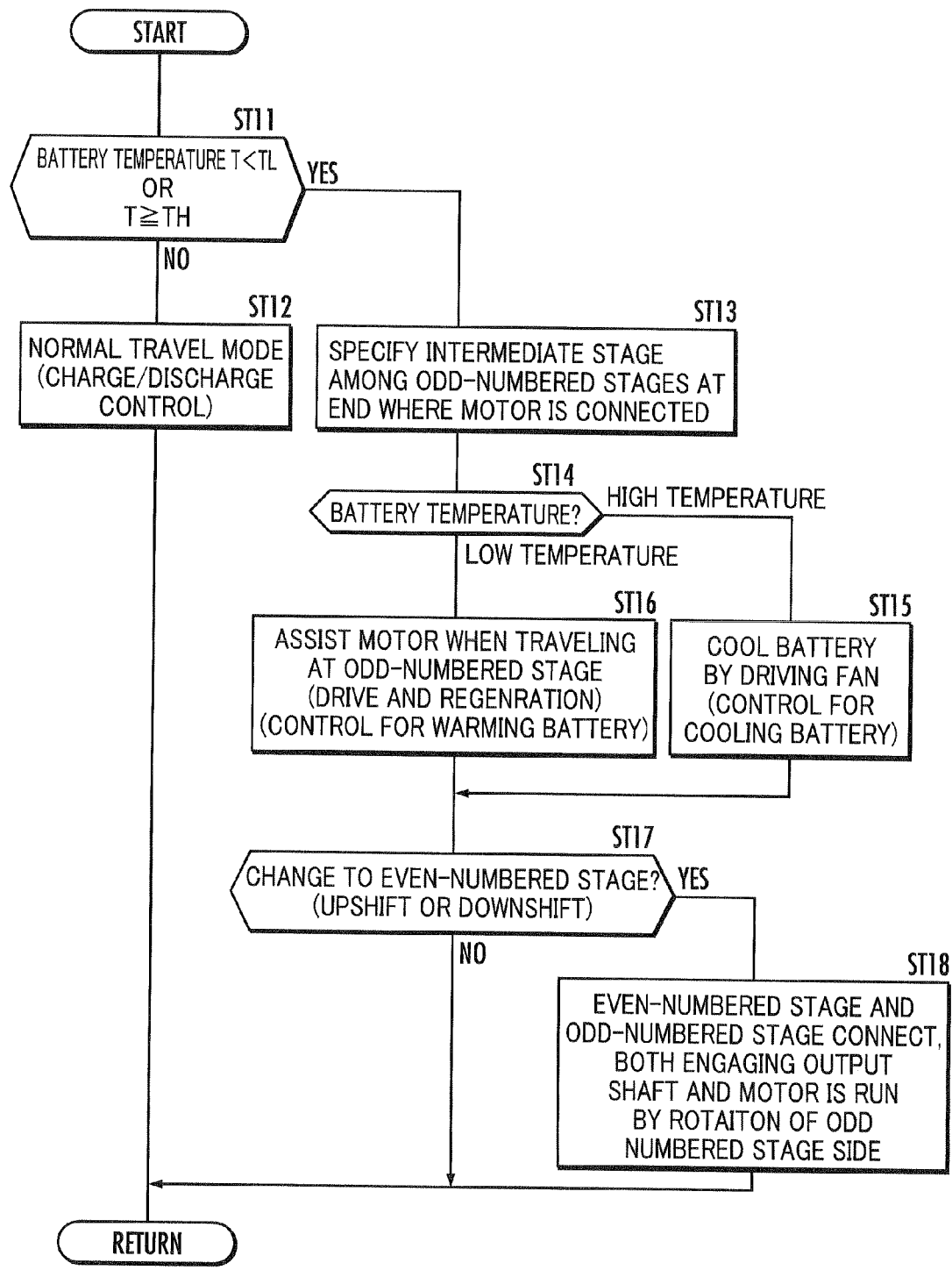
FIG. 11 is a flowchart illustrating the operation of the hybrid vehicle according to the first embodiment of the present invention.

Referring now to FIG. 11, the operation of the hybrid vehicle according to the first embodiment will be described.

In step ST11, it is determined whether the temperature of the battery 7 is below the first predetermined temperature TL or the second predetermined temperature TH or higher. If the result of the determination indicates that the temperature of the battery 7 is below the first predetermined temperature TL or the second predetermined temperature TH or higher, then the procedure proceeds to the processing in step ST13, or otherwise, the procedure proceeds to the processing in step ST12.

In step ST12, the vehicle travels in a normal traveling mode if the temperature of the battery 7 is in a normal temperature range (−10 to 49° C.). At this time, the output of the battery 7 is larger than that when the battery temperature is low or high. Hence, the hybrid vehicle according to the first embodiment allows gear shifting to be accomplished relatively quickly regardless of the SOC.

In step ST13, the ECU 8 specifies a transmission stage of an intermediate stage (e.g., the 3rd-speed stage) of the first transmission group (odd-numbered stages) provided on the motive power transmission shaft (the first main input shaft 14)

on the side where the electric motor 3 is connected. Regarding the plurality of transmission stages (odd-numbered stages) provided on the motive power transmission shaft (the first main input shaft 14) to which the electric motor 3 is connected, the transmission stage is restricted to one intermediate stage (e.g., the 3rd-speed stage) among the plurality of transmission stages (the plurality of odd-numbered stages) when the battery temperature is extremely low or high.

If it is determined in step ST14 that the temperature of the battery 7 detected by the battery temperature sensor is high, then the ECU 8 proceeds to the processing in step ST15, or if it is determined that the temperature of the battery 7 is low (lower than the first predetermined temperature TL), then the ECU 8 proceeds to the processing in step ST16.

In step ST15, the ECU 8 drives the fan (blower) 7a provided in the vicinity of the battery 7. This causes the air in the vehicle to be sent to the battery 7, thus cooling the battery 7.

In step ST16, the ECU 8 actively performs motor assist when the vehicle is traveling on an odd-numbered stage. For example, when the temperature of the battery 7 is low, carrying out the motor assist charges/discharges the battery 7 and the battery 7 itself generates heat due to the internal resistance of the battery 7, thus making it possible to increase the temperature of the battery 7.

At this time, the lubricating/operating oil (ATF: Automatic Transmission Fluid) of the electric motor 3 and the motive power transmitting system 1 is heated at the same time by controlling the drive and regeneration of the electric motor 3. Increasing the temperature of a lubricant makes it possible to reduce the load when the electric motor 3 rotates, as compared with the case where the temperature is low.

In step ST17, the ECU 8 determines whether to change to an even-numbered stage according to the traveling condition, a required driving force and the like while the vehicle is traveling at an odd-numbered stage. The ECU 8 proceeds to the processing in step ST18 if it is determined to change to an even-numbered stage.

When the speed has been changed from the odd-numbered stage to an even-numbered stage, the ECU 8 carries out control in step ST18 such that the even-numbered stage and the odd-numbered stage both engage with the output shaft 26. In other words, when the vehicle is traveling at the even-numbered stage by engine drive, the even-numbered stage and the odd-numbered stage are both engaged with the output shaft 26. The first clutch C1 is in the disconnected state.

More specifically, the both-engaged state mentioned above is a state in which the 3rd-speed gear 24a and the first main input shaft 14 are connected by the first synchronous engaging mechanism S1 and the 2nd-speed gear 25a or the 4th-speed gear 25b are connected to the second main input shaft 22 by the second synchronous engaging mechanism S2. In other words, the electric motor 3 can be run while the vehicle is traveling by driving the engine 2, using an even-numbered stage gear, thus allowing the battery 7 to be warmed.

After the operations performed in steps ST17 and ST18, the procedure returns to the processing in step ST11.

More specifically, until the temperature of the battery 7 reaches the normal temperature, the operations indicated by step ST13 through step ST18 are performed, and when the temperature of the battery 7 reaches the normal temperature, the procedure moves to a normal traveling mode (normal charge/discharge control) (step ST12).

As described above, according to the first embodiment, the transmission of the motive power transmitting system 1 has a first transmission group (odd-numbered stages) equipped with the plurality of transmission stages having different transmission ratios, which are capable of transmitting motive power from the electric motor 3 and/or the engine 2 to the drive wheels 4, and a second transmission group (even-numbered stages) equipped with the plurality of transmission stages having different transmission ratios, which are capable of transmitting motive power from the engine 2 to the drive wheels 4. The ECU 8 sets, by the low/high temperature processor 8d, the transmission stage of the transmission to an intermediate stage (e.g., the 3rd-speed stage) among the transmission stages of the first transmission group (odd-numbered stages) at the side where the electric motor 3 is connected when the temperature detected by the temperature sensor 8a is below the first predetermined temperature TL or the second predetermined temperature TH or higher. This makes it possible to prevent the deterioration of the gear shift responsiveness and the deterioration of the driveability by having the vehicle travel with the transmission stage limited to the 3rd-speed stage, which is an odd-numbered stage on the side, where the electric motor 3 is connected, without the need for performing the operation for adjusting the rotational speed to the one corresponding to a target transmission stage by the electric motor 3 at the time of gear shifting in the case where the temperature of the battery 7 is low or high and the output of the battery 7 is small Further, even when an upshift or a downshift (gear shifting) is implemented from an intermediate stage of the first transmission group (odd-numbered stages) at the side, where the electric motor 3 is connected, to the second transmission group (even-numbered stages), the operation for adjusting the rotational speed to a target transmission stage by the electric motor 3 at the time of the gear shifting will not be carried out, thus making it possible to prevent the driveability from deteriorating.

Further, according to the first embodiment, the ECU 8 controls the low/high temperature processor 8d to allow the motive power to be transmitted from the engine 2 to the drive wheels 4 through the intermediary of the second transmission group (even-numbered stages) and also to allow the motive power to be transmitted between the electric motor 3 and the drive wheels 4 through the intermediary of the first transmission group (odd-numbered stages), thus enabling the electric motor 3 to run. At this time, the battery 7 can be charged. In other words, passing current through internal resistor of the battery 7 warms the battery 7. Hence, the temperature of the battery 7 can be increased in a relatively short time from a low temperature (below the first predetermined temperature) to the normal temperature (the first predetermined temperature or higher but below the second predetermined temperature). In other words, the traveling mode in the state wherein the temperature of the battery 7 is low can be changed to the traveling mode in the state wherein the temperature thereof is normal in a relatively short time.

Further, according to the first embodiment, when the temperature of the battery 7 is lower than the first predetermined temperature, the ECU 8 controls the low/high temperature processor 8d so as to enable the transmission of the motive power between the electric motor and the engine 2 and also to transmit the motive power to the drive wheels 4 from the engine 2 and the electric motor 3 through the intermediary of the first transmission group (odd-numbered stages). Passing current through the first transmission group, that is, the internal resistor of the battery 7, warms the battery 7. Thus, the temperature of the battery 7 can be increased in a relatively short time from a low temperature (below the first predetermined temperature) to the normal temperature (the first predetermined temperature or higher but below the second predetermined temperature). In other words, the traveling mode in the state wherein the temperature of the battery 7 is low can be changed to the traveling mode in the state wherein the temperature thereof is normal in a relatively short time.

[Second Embodiment]

Figure 12:
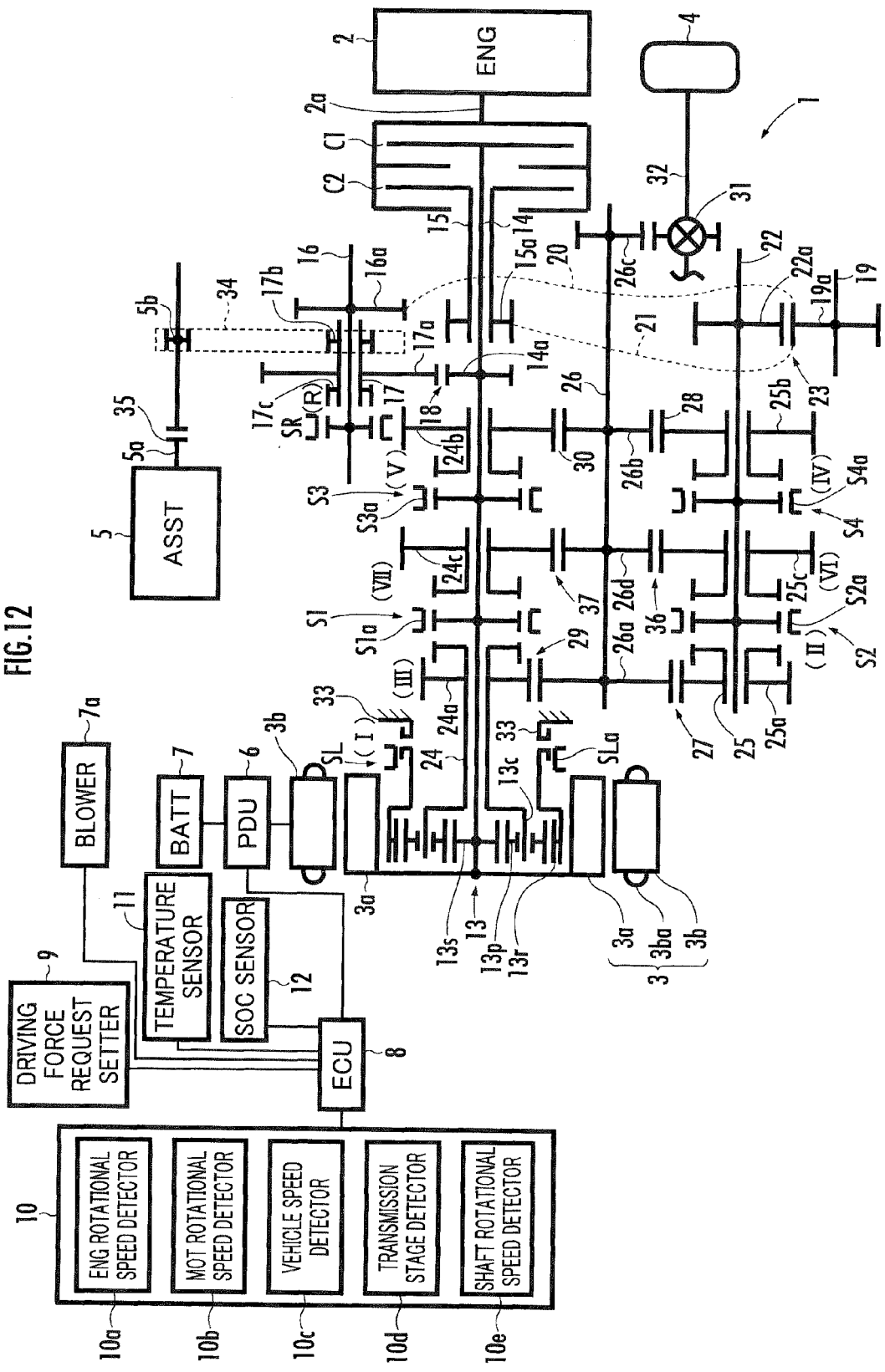
FIG. 12 is a construction diagram of the hybrid vehicle according to a second embodiment of the present invention.

Referring now to FIG. 12, a hybrid vehicle according to a second embodiment of the present invention will be described. A motive power transmission system 1 of the second embodiment is constituted of transmission stages of seven forward stages and one reverse stage. This means that two transmission stages, namely, a 6th-speed stage and a 7th-speed stage, are added as the forward stages to the motive power transmission system 1 of the first embodiment.

A 7th-speed gear train 37 is added to the motive power transmission system 1 of FIG. 1 as an odd-numbered gear train that establishes an odd-numbered transmission stage in the transmission ratio rank. A seventh-speed gear 24c, which is a drive gear of the 7th-speed gear train 37, is rotatably supported between a 3rd-speed gear 24a and a 5th-speed gear 24b by a first main input shaft 14.

The first main input shaft 14 and a second auxiliary input shaft 24 are connected through the intermediary of a first synchronous engaging mechanism S1 and a third synchronous engaging mechanism S3, which are constituted of synchromesh mechanisms. The first synchronous engaging mechanism S1 and the third synchronous engaging mechanism S3 are provided on the first main input shaft 14. The first synchronous engaging mechanism S1 selectively connects the 3rd-speed gear 24a and the 7th-speed gear 24c to the first main input shaft 14, while the third synchronous engaging mechanism S3 selectively connects the 5th-speed gear 24b to the first main input shaft 14.

As with the motive power transmission system 1 of FIG. 1, the first synchronous engaging mechanism S1 moves a sleeve S1a in the axial direction of the second auxiliary input shaft 24 by an actuator and a shift fork, not shown, thereby selectively connecting the 3rd-speed gear 24a and the 7th-speed gear 24c to the first main input shaft 14. More specifically, if the sleeve S1a is moved from the neutral position in the drawing toward the 3rd-speed gear 24a, then the 3rd-speed gear 24a and the first main input shaft 14 are connected. Meanwhile, if the sleeve S1a is moved from the neutral position in the drawing toward the 7th-speed gear 24c, then the 7th-speed gear 24c and the first main input shaft 14 are connected.

As with the first synchronous engaging mechanism S1, the third synchronous engaging mechanism S3 moves a sleeve S3a in the axial direction of the second auxiliary input shaft 24 by an actuator and a shift fork, not shown, thereby selectively connecting the 5th-speed gear 24b to the first main input shaft 14. More specifically, if the sleeve S3a is moved from the neutral position in the drawing toward the 5th-speed gear 24b, then the 5th-speed gear 24b and the first main input shaft 14 are connected.

Further, a 6th-speed gear train 36 is added to the motive power transmission system 1 of FIG. 1 as an even-numbered gear train that establishes an even-numbered transmission stage in the transmission ratio rank. A 6th-speed gear 25c, which is a drive gear of the 6th-speed gear train 36, is rotatably supported between a 2nd-speed gear 25a and a 4th-speed gear 25b by a second main input shaft 22.

The second main input shaft 22 and a third auxiliary input shaft 25 are connected through the intermediary of a second synchronous engaging mechanism S2 and a fourth synchronous engaging mechanism S4, which are constituted of synchromesh mechanisms. The second synchronous engaging mechanism S2 and the fourth synchronous engaging mechanism S4 are provided on the second main input shaft 22. The second synchronous engaging mechanism S2 selectively connects the 2nd-speed gear 25a and the 6th-speed gear 25c to the second main input shaft 22, while the fourth synchronous engaging mechanism S4 selectively connects the 4th-speed gear 25b to the second main input shaft 22.

As with the motive power transmission system 1 of FIG. 1, the second synchronous engaging mechanism S2 moves a sleeve S2a in the axial direction of a third auxiliary input shaft 25 by an actuator and a shift fork, not shown, thereby selectively connecting the 2nd-speed gear 25a and the 6th-speed gear 25c to the second main input shaft 22. More specifically, if the sleeve S2a is moved from the neutral position in the drawing toward the 2nd-speed gear 25a, then the 2nd-speed gear 25a and the second main input shaft 22 are connected. Meanwhile, if the sleeve S2a is moved from the neutral position in the drawing toward the 6th-speed gear 25c, then the 6th-speed gear 25c and the second main input shaft 22 are connected.

As with the first to the third synchronous engaging mechanisms S1 to S3, the fourth synchronous engaging mechanism S4 moves a sleeve S4a in the axial direction of the third auxiliary input shaft 25 by an actuator and a shift fork, not shown, thereby selectively connecting the 4th-speed gear 25b to the second main input shaft 22. More specifically, if the sleeve S4a is moved from the neutral position in the drawing toward the 4th-speed gear 25b, then the 4th-speed gear 25b and the second main input shaft 22 are connected.

The third auxiliary input shaft 25 and the output shaft 26 are connected through the intermediary of the 2nd-speed gear train 27, the 4th-speed gear train 28 and the 6th-speed gear train 36. The 2nd-speed gear train 27 is formed by the gear 25a fixed on the third auxiliary input shaft 25 and a gear 26a fixed on the output shaft 26, the gear 25a and the gear 26a meshing with each other. A 4th-speed gear train 28 is formed by a gear 25b fixed on the third auxiliary input shaft 25 and a gear 26b fixed on the output shaft 26. The 6th-speed gear train 36 is formed by the gear 25c fixed on the third auxiliary input shaft 25 and a gear 26d fixed on the output shaft 26, the gear 25c and the gear 26d meshing with each other.

Further, the second auxiliary input shaft 24 and the output shaft 26 are connected through the intermediary of the 3rd-speed gear train 29, a 5th-speed gear train 30 and a 7th-speed gear train 37. The 3rd-speed gear train 29 is constituted by the gear 24a fixed on the second auxiliary input shaft 24 and the gear 26a fixed on the output shaft 26, the gear 24a and the gear 26a meshing with each other. The 5th-speed gear train 30 is constituted by the gear 24b fixed on the second auxiliary input shaft 24 and the gear 26b fixed on the output shaft 26, the gear 24b and the gear 26b meshing with each other. The 7th-speed gear train 37 is constituted by the gear 24c fixed on the second auxiliary input shaft 24 and the gear 26d fixed on the output shaft 26, the gear 24c and the gear 26d meshing with each other.

The gear 26d, which is a driven gear in engagement with the 6th-speed gear 25c and the 7th-speed gear 24c, is secured on the output shaft 26 together with the gears 26a and 26b, which are driven gears, and a final gear 26c.

The rest of the construction is the same as that of the construction of the motive power transmission system 1 of FIG. 1, so that the description thereof will be omitted.

The gear 24a and the gears 24b and 24c correspond to the first transmission group. The gear 25a and the gears 25b and 25c correspond to the second transmission group. The first transmission group and the second transmission group correspond to the transmission.

A description will now be given of the operation of the motive power transmission system 1 of the second embodiment constructed as described above. The 1st-speed stage to the 3rd-speed stage and the reverse stage are the same as those of the motive power transmission system 1 of the first embodiment, so that the description thereof will be omitted.

The 4th-speed stage is established by setting a fourth synchronous engaging mechanism S4 in a state wherein the second main input shaft 22 and the 4th-speed gear 25b are connected. In the case of a travel on an engine 2, a second clutch C2 is set in an ON state. At the 4th-speed stage, the driving force output from the engine 2 is transmitted to drive wheels 4 through the intermediary mainly of a first auxiliary input shaft 15, a gear train 21, an intermediate shaft 19, a gear train 23, the second input shaft 22, the 4th-speed gear train 28, and the output shaft 26.

In other words, the motive power transmission system 1 of the second embodiment differs from the motive power transmission system 1 of the first embodiment in that the 4th-speed gear 25b and the second main input shaft 22 are connected by the fourth synchronous engaging mechanism S4 rather than the second synchronous engaging mechanism S2 to establish the 4th-speed stage.

As with the motive power transmission system 1 of the first embodiment, the assist travel, the EV travel and the deceleration regenerative drive can be accomplished also at the 4th-speed stage. Further, the same operation as with the motive power transmission system 1 of the first embodiment is performed to implement a downshift or a pre-shift to the 3rd-speed stage or an upshift or a pre-shift to the 5th-speed stage while the vehicle is traveling at the 4th-speed stage. However, to implement the upshift or the pre-shift to the 5th-speed stage, the first main input shaft 14 and the 5th-speed gear 24b are set in a connected state or in a state close thereto by a third synchronous engaging mechanism S3.

The 5th-speed stage is established by setting the third synchronous engaging mechanism S3 in the state wherein the first main input shaft 14 and the 5th-speed gear 24b are connected. When the vehicle travels on the engine 2, a first clutch C1 is set to an ON state. At the 5th-speed stage, the driving force output from the engine 2 is transmitted to the drive wheels 4 through the intermediary mainly of the first main input shaft 14, a 5th-speed gear train 30, and the output shaft 26.

In other words, the motive power transmission system 1 of the second embodiment differs from the motive power transmission system 1 of the first embodiment in that the 5th-speed gear 24b and the first main input shaft 14 are connected by the third synchronous engaging mechanism S3 rather than the first synchronous engaging mechanism S1 in order to establish the 5th-seed stage.

As with the motive power transmission system 1 of the first embodiment, the assist travel, the EV travel and the deceleration regenerative drive can be accomplished also at the 5th-speed stage.

During the travel at the 5th-speed stage, an ECU 8 predicts, on the basis of the traveling condition of the vehicle, whether the next target transmission stage will be the 4th-speed stage or the 6th-speed stage. If the ECU 8 predicts a downshift to the 4th-speed stage, then a fourth synchronous engaging mechanism S4 is set to a state wherein the 4th-speed gear 25b and the second main input shaft 22 are connected or to a pre-shift state, which is close to the aforesaid state. If the ECU 8 predicts an upshift to the 6th-speed stage, then the second synchronous engaging mechanism S2 is set to a state wherein the 6th-speed gear 25c and the second main input shaft 22 are connected or to a pre-shift state, which is close to the aforesaid state. Thus, the upshift or downshift from the 5th-speed stage can be smoothly accomplished.

The 6th-speed stage is established by setting the second synchronous engaging mechanism S2 to a state wherein the second main input shaft 22 and a 6th-speed gear 25c are connected. For traveling on the engine 2, the second clutch C2 is set to the ON state. At the 6th-speed stage, the driving force output from the engine 2 is transmitted to the drive wheels 4 through the intermediary mainly of the first auxiliary input shaft 15, the gear train 21, the intermediate shaft 19, the gear train 23, the second main input shaft 22, the 6th-speed gear train 36, and the output shaft 26.

With the second clutch C2 set to the ON state and the first clutch C1 set to the ON state, the assist travel by the electric motor 3 at the 6th-speed stage can be engaged by driving the engine 2 and also driving the electric motor 3. Further, stopping the drive on the engine 2 in this state allows the EV travel to be engaged.

During the travel at the 6th-speed stage, the ECU 8 predicts, on the basis of the traveling condition of the vehicle, whether the next target transmission stage will be the 5th-speed stage or the 7th-speed stage. If the ECU 8 predicts a downshift to the 5th-speed stage, then a third synchronous engaging mechanism S3 is set to a state wherein the first main input shaft 14 and the 5th-speed stage 24b are connected or to a pre-shift state, which is close to the aforesaid state. If the ECU 8 predicts an upshift to the 7th-speed stage, then the first synchronous engaging mechanism S1 is set to a state wherein the first main input shaft 14 and the 7th-speed stage 24c are connected or to a pre-shift state, which is close to the aforesaid state. Thus, the upshift or downshift from the 6th-speed stage can be smoothly accomplished.

The 7th-speed stage is established by setting the first synchronous engaging mechanism S1 to a state wherein the first main input shaft 14 and a 7th-speed gear 24c are connected. For traveling on the engine 2, the first clutch C1 is set to the ON state. At the 7th-speed stage, the driving force output from the engine 2 is transmitted to the drive wheels 4 through the intermediary mainly of the first main input shaft 14, the 7th-speed gear train 37, and the output shaft 26.

With the first clutch C1 set to the ON state, the assist travel by the electric motor 3 at the 7th-speed stage can be engaged by driving the engine 2 and also driving the electric motor 3. Further, setting the first clutch C1 to the OFF state allows the EV travel to be engaged. During the EV travel, the first clutch C1 can be set to the ON state and the drive on the engine 2 can be stopped and the EV travel can be continued. Further, the deceleration regenerative drive can be accomplished at the 7th-speed stage.

While the vehicle is traveling at the 7th-speed stage, if the ECU 8 determines that the next target transmission stage will be the 6th-speed stage on the basis of the traveling condition of the vehicle, then the ECU 8 sets the second synchronous engaging mechanism S2 to a state wherein the 6th-speed gear 25c and the second main input shaft 22 are connected or a pre-shift state, which is close to the aforesaid state. This permits a smooth downshift from the 7th-speed stage to the 6th-speed stage.

In the hybrid vehicle of the second embodiment, the ECU 8 carries out control similar to that in the first embodiment according to the temperature of the battery 7.

More specifically, a low/high temperature processor 8d of the second embodiment specifies an intermediate stage (e.g., the 3rd-speed stage or the 5th-speed stage in the second embodiment) among the transmission stages of a first transmission group (odd-numbered stages) when the temperature detected by a temperature sensor 8a is below a first predetermined temperature TL or a second predetermined temperature TH or higher. In other words, according to the second embodiment, the transmission stage is limited to one transmission stage (the 3rd-speed stage or the 5th-speed stage) among the aforesaid odd-numbered stages. This makes it possible to prevent the deterioration of the driveability without the need for performing, for example, the operation for adjusting the rotational speed to the one corresponding to a target transmission stage by the electric motor at the time of gear shifting.

Further, in the case where, for example, an upshift or a downshift is to be made from the state in which the intermediate stage (the 3rd-speed stage or the 5th-speed stage) of the aforesaid first transmission group (odd-numbered stages) has been selected, setting the transmission stage to an even-numbered stage (the 2nd-speed stage or the 4th-speed stage or the 6th-speed stage) provided adjacently to the motive power transmission shaft (the second main input shaft 22) to which the electric motor 3 is not connected makes it possible to obviate the need for the rotational adjustment by the electric motor 3, prevent the deterioration of gear shift responsiveness caused by a drop in the output of the battery, and prevent the deterioration of the driveability.

Further, the low/high temperature processor 8d according to the second embodiment carries out control to rotate the electric motor 3, enabling the transmission of the motive power from the engine 2 to the drive wheels 4 through the intermediary of a second transmission group (even-numbered stages) and also enabling the transmission of the motive power between the electric motor 3 and the drive wheels 4 through the intermediary of the first transmission group (odd-numbered stages). To be more specific, the low/high temperature processor 8d carries out the control such that, for example, the 2nd-speed stage and the 3rd-speed stage, the 3rd-speed stage and the 4th-speed stage, the 4th-speed stage and the 5th-speed stage, the 5th-speed stage and the 6th-speed stage, or the 6th-speed stage and the 7th-speed stage mesh together with the output shaft 22. In this state, the electric motor 3 can be run, making it possible to charge/discharge the battery 7. In other words, passing current through the internal resistor of the battery 7 warms the battery 7.

[Third Embodiment]

A hybrid vehicle of a third embodiment in accordance with the present invention will now be described. The hybrid vehicle according to the third embodiment has a transmission equipped with a 1st-speed stage to a 5th-speed stage of the same constructions as those of the first embodiment. The descriptions of the same constructions and functions as those of the first embodiment will be omitted. The following will describe the functions of a low/high temperature processor 8d of the hybrid vehicle according to the third embodiment.

If the temperature detected by a temperature sensor 8a is below a first predetermined temperature TL, then the low/high temperature processor 8d allows the motive power to be transmitted from an engine 2 to the drive wheels 4 through the intermediary of a second transmission group (even-numbered stages) and also controls the drive or the regeneration of an electric motor 3 thereby to warm a battery 7.

Figure 13:
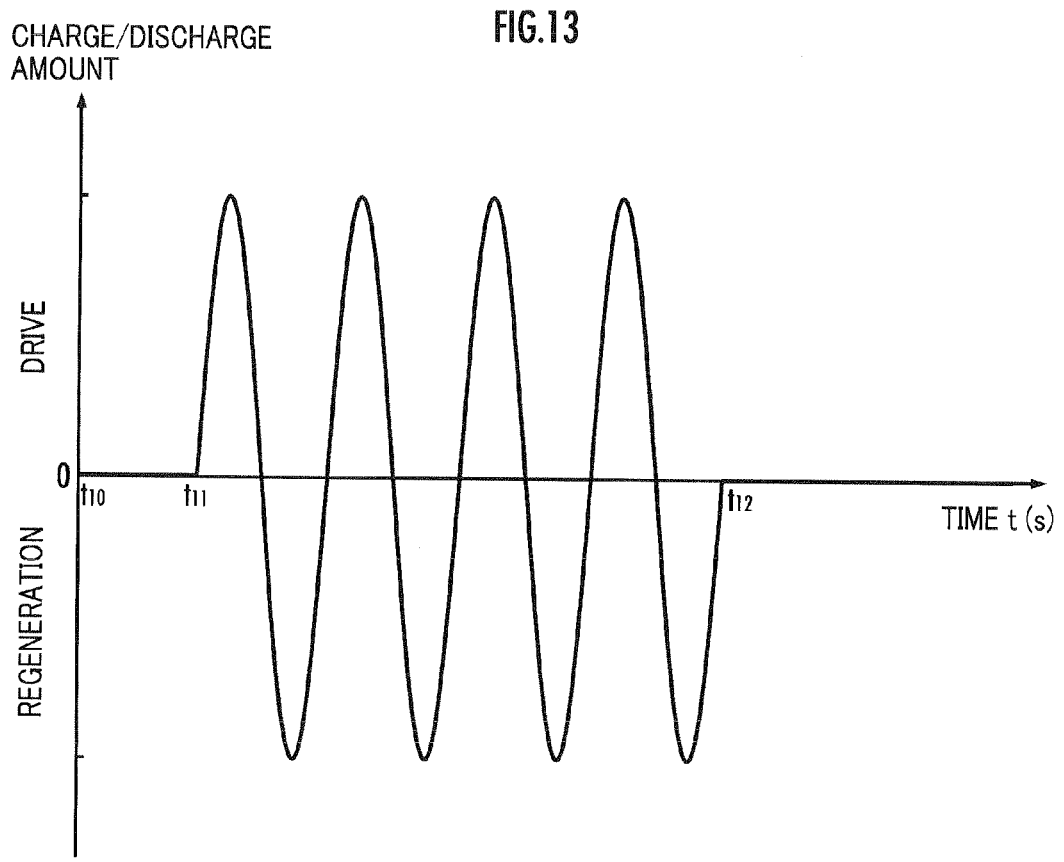
FIG. 13 is a graph illustrating the operation at the time of charging/discharging of the battery of the hybrid vehicle according to a third embodiment of the present invention.

The low/high temperature processor 8d of the third embodiment controls the drive or the regeneration of the electric motor 3 to charge/discharge the battery 7 thereby to warm the battery 7. More specifically, as illustrated in FIG. 13, the battery 7 is charged/discharged by switching between the drive and the regeneration at a frequency that is higher than a predetermined frequency.

Specifically, from time t10 to time t11, if a charge/discharge control condition for low temperature or high temperature is not satisfied, then an ECU 8 carries out battery control based on a normal travel mode.

From time t11 to time t12, if a condition for carrying out the charge/discharge control for low temperature or high temperature is satisfied, then the low/high temperature processor 8d controls the drive and the regeneration of the electric motor 3 at a relatively high frequency (200 Hz) so as to charge/discharge the battery 7.

After time t12, if the charge/discharge control condition for low temperature or high temperature is not satisfied, then the ECU 8 carries out battery control based on a normal travel mode.

In the embodiments described above, for example, the peak value of current by the charge/discharge of the battery 7 is set to 10 A and the frequency of the current at the time of charge/discharge is set to 200 Hz. The frequency of the current at the time of charge/discharge is preferably set to, for example, 200 Hz or more but 2000 Hz or less. The peak value of the current at the time of charge/discharge and the frequency of the current at the time of charge/discharge are appropriately set according to the durability, the AC resistance value, the DC resistance value and the like of the battery 7.

Further, if the temperature detected by the temperature sensor 8a is below the first predetermined temperature TL, then the low/high temperature processor 8d of the third embodiment controls the drive or the regeneration of the battery 7 according to the temperature of the battery 7 so as to increase the amount of charge/discharge of the battery 7 as the temperature decreases.

Figure 14:
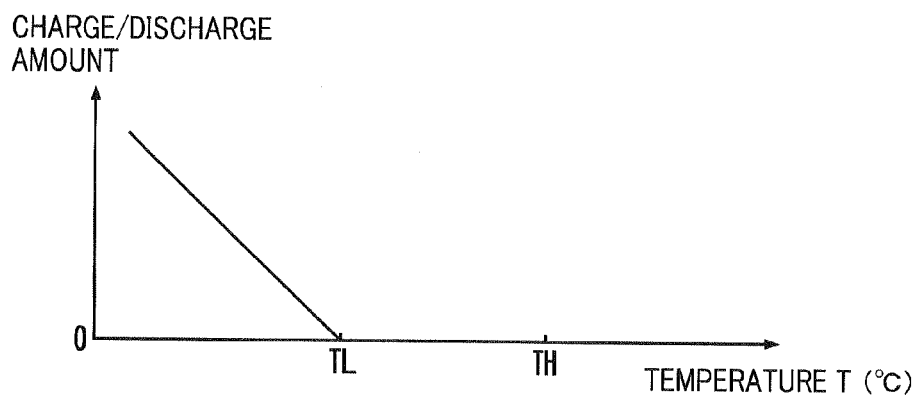
FIG. 14 is a graph illustrating the relationship between temperatures and the charge/discharge amounts of the battery of the hybrid vehicle according to the third embodiment of the present invention.

To be more specific, as illustrated in FIG. 14, if the temperature detected by the temperature sensor 8a is below the first predetermined temperature TL, then the low/high temperature processor 8d controls the drive or the regeneration of the battery 7 according to a temperature T of the battery 7 such that the amount of charge/discharge of the battery 7 increases as the temperature T decreases. This makes it possible to set the battery 7 to a normal temperature more quickly as the battery temperature is lower.

Further, if the temperature of the battery 7 is the first predetermined temperature TL or less, the low/high temperature processor 8d of the third embodiment carries out control to drive a compressor 41 serving as an assist device 5 by the electric motor 3 thereby to warm the battery 7.

Further, the low/high temperature processor 8d of the third embodiment carries out control to drive the compressor 41 so as to warm a vehicle compartment 100a by an air conditioner 40 and also drives a blower 7a to send the air in the vehicle compartment 100a to the main body of the battery 7, thereby warming up the battery 7.

Figure 15:
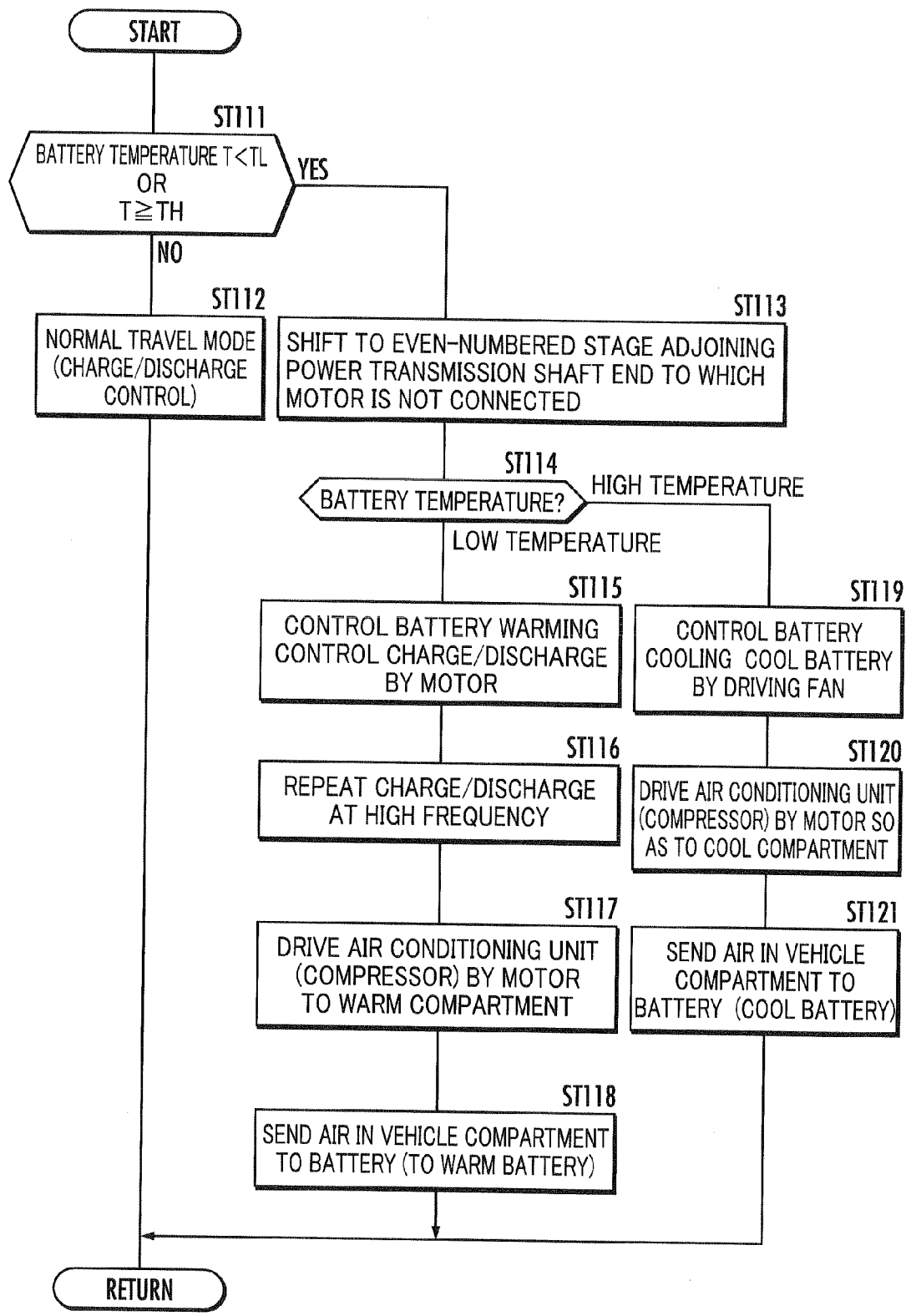
FIG. 15 is a flowchart illustrating the operation of the hybrid vehicle according to the third embodiment of the present invention.

Referring now to FIG. 15, the operation of the hybrid vehicle according to the third embodiment will be described.

In step ST111, the ECU 8 determines whether the temperature of the battery 7 is below the first predetermined temperature TL or a second predetermined temperature TH or higher. If the result of the determination indicates that the temperature of the battery 7 is below the first predetermined temperature TL or the second predetermined temperature TH or more, then the ECU 8 proceeds to the processing in step ST113, or otherwise, proceeds to the processing in step ST112.

In step ST112, if the temperature of the battery 7 is within a normal temperature range, then the ECU 8 carries out the travel in a normal travel mode. At this time, the output of the battery 7 is larger than that at a low temperature or a high temperature. For this reason, in the hybrid vehicle according to the third embodiment, a gearshift change can be accomplished in a relatively short time (e.g., approximately 0.3 sec.) regardless of the SOC.

In step ST113, the ECU 8 changes the speed to a transmission stage (an even-numbered stage) provided adjacently to a motive power transmission shaft to which the electric motor 3 is not connected. At the time of a travel, the vehicle travels on the engine drive at an even-numbered gear stage (the motive power transmission shaft to which the motor is not connected), and a shift transmission gear of an odd-numbered stage is set to a neutral (a first synchronous engaging mechanism S1 being set to a neutral position).

In step ST114, if the temperature T of the battery 7 that has been detected is low (T<TL), then the ECU 8 proceeds to the processing in step ST115, or if the temperature T is high, then the ECU 8 proceeds to the processing in step ST119.

In step ST115, the ECU 8 controls the warming of the battery. According to the third embodiment, when controlling the warming of the battery 7, the drive and the regeneration of the electric motor 3 are carried out to perform the charge/discharge of the battery 7 optimum for increasing the temperature of the battery 7.

To be more specific, in step ST116, the ECU 8 charges/discharges the battery 7 by controlling the drive and the regeneration of the motor such that the peak value of the current at the time of charge/discharge of the battery 7 becomes 10 A and the frequency of the current at the time of the charge/discharge becomes 200 Hz. The peak value of the current and the frequency of the current at the time of charge/discharge are appropriately set according to the durability, the AC resistance value, the DC resistance value and the like of the battery 7. At this time, control is preferably carried out such that the temperature of the battery 7 is increased by making use of the AC resistance of the battery 7 at a relatively small current so as to protect the battery 7 from deterioration.

In step ST117, the ECU 8 transmits, by the electric motor 3, the motive power from the motive power transmission shaft (a first main input shaft 14) at the end where the electric motor 3 is connected to the compressor 41 (the air conditioner 40) serving as a load connected through the intermediary of a belt, thereby driving the compressor 41.

The battery temperature can be increased by discharging the battery 7 by driving the compressor 41, which serves as a load, by the electric motor 3 through the intermediary of the belt, thus generating heat in the battery 7. Further, the ECU 8 drives the compressor 41 to heat the air in the vehicle compartment 100a by the air conditioner 40.

In step ST118, the ECU 8 carries out control to drive the blower 7a to send the air in the vehicle compartment 100a to the battery 7 so as to warm the battery 7 by the heat of the air. After the operation from steps ST115 to ST118 described above, the procedure returns to the processing in step ST111.

In step ST119, the ECU 8 carries out control to drive the blower (fan) 7a provided in the vicinity of the battery 7 to cool the battery 7 when the temperature of the battery 7 is high.

In step ST120, the ECU 8 further drives the compressor 41 by the electric motor 3 to cool the vehicle compartment 100a by the air conditioner 40. This causes the temperature of the air in the vehicle compartment to be lower than the battery temperature.

In step ST121, the ECU 8 drives the blower 7a to send the air in the vehicle compartment 100a (the air temperature being lower than the battery temperature) to the battery 7 so as to release the heat from the battery 7, thus allowing the high temperature to be reduced to the normal temperature. After the operation from the aforesaid steps ST119 to ST121, the procedure returns to step ST111.

Further, if the battery temperature is the first predetermined temperature TL or more and the second predetermined temperature TH or less, then the travel mode is set to the normal-temperature travel mode (charge/discharge control based on the normal travel mode).

As described above, according to the third embodiment, if the temperature detected by a temperature sensor 8a is below the first predetermined temperature TL, then the ECU 8 allows the motive power to be transmitted from the engine 2 to the drive wheels 4 through the intermediary of the second transmission group (even-numbered stages) and also controls the drive or the regeneration of the electric motor 3 thereby to warm the battery 7. In other words, when the temperature of the battery 7 is low, the battery 7 can be set to the normal temperature in relatively short time by warming up the battery 7 relatively easily. This makes it possible to control the time required for changing the low-temperature travel mode to the normal travel mode to be relatively short, thus permitting improved driveability.

Further, according to the third embodiment, the ECU 8 carries out control to switch between the drive and the regeneration of the electric motor 3 at a frequency that is higher than a predetermined frequency when charging/discharging the battery 7. More specifically, switching between the drive and the regeneration of the electric motor 3 at a higher frequency makes it possible to charge/discharge the battery 7 relatively easily. Further, passing an AC current through the internal resistor of the battery 7 permits a reduction in the load on the battery 7 at the time of charge/discharge. Further, the battery 7 can be warmed relatively easily at a low load. In other words, the time required for switching the travel mode at low temperature to the normal travel mode can be made relatively shorter, thus allowing improved driveability to be achieved.

Further, according to the third embodiment, when the electric motor 3 drives the compressor 41 for the air conditioner, current is passed through the internal resistor of the battery 7 by the discharge of the battery 7, thus making it possible to warm the battery 7 relatively easily. In other words, the time required for the travel mode at low temperature to be changed over to the normal travel mode can be reduced to a relatively short time, thus permitting improved driveability.

Further, according to the third embodiment, the ECU 8 drives the compressor 41 by the electric motor 3 to warm the vehicle compartment 100a by the air conditioner 40. The air, which is relatively warm, in the vehicle compartment 100a is sent to the main body of the battery 7 by the blower 7a (fan) so as to warm the battery 7. In other words, the battery 7 can be switched to a normal temperature state from a low temperature state relatively easily in relatively short time, thus allowing improved driveability to be achieved.

Further, the hybrid vehicle according to the third embodiment allows the temperature of the battery 7 to be controlled during travel.

Further, the transmission of the motive power transmission system 1 of the hybrid vehicle according to the third embodiment may be formed of the transmission having seven transmission stages, namely, a 1st-speed stage through a 7th-speed stage, as illustrated in FIG. 12. In this case also, the ECU 8 may carry out the same control.

[Fourth Embodiment]

Figure 16:
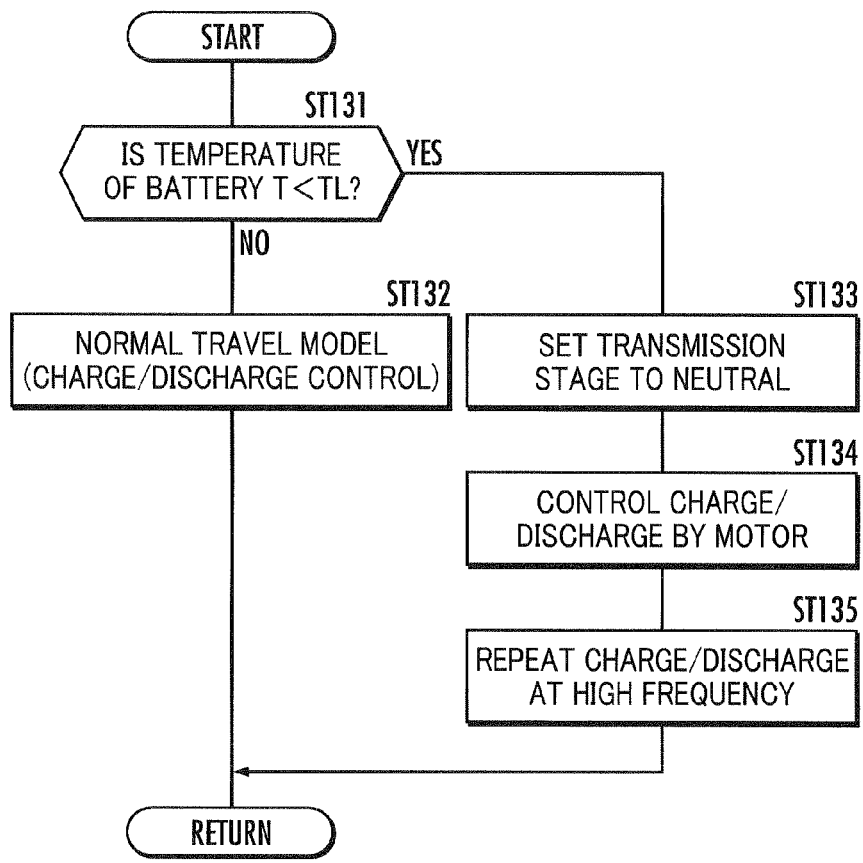
FIG. 16 is a flowchart illustrating the operation of the hybrid vehicle according to a fourth embodiment of the present invention.

A hybrid vehicle according to a fourth embodiment is a hybrid vehicle having the same construction as that of the third embodiment and has a transmission equipped with a 1st-speed stage to a 5th-speed stage. The descriptions of the same constructions and functions as those of the third embodiment will be omitted. The following will describe the operation of the hybrid vehicle according to the fourth embodiment of the present invention with reference to FIG. 16.

In step ST131, an ECU 8 determines whether the temperature of a battery 7 is below a first predetermined temperature TL or whether the temperature of the battery 7 is a second predetermined temperature TH or higher. If the result of the determination indicates that the temperature of the battery 7 is below the first predetermined temperature TL or the second predetermined temperature TH or higher, then the ECU 8 proceeds to the processing in step ST133, or otherwise, the ECU 8 proceeds to the processing in step ST132.

In step ST132, if a battery temperature T is within a normal temperature range, then the ECU 8 performs travel in a normal travel mode.

In step ST133, the ECU 8 sets the transmission stage of the transmission to a neutral state.

In step ST134, the ECU 8 controls the warming of the battery 7. More specifically, with the transmission stage of the transmission set in the neutral state, the drive and the regeneration of the electric motor 3 are carried out to charge/discharge the battery 7 so as to increase the temperature of the battery 7 with a relatively small current by making use of only an AC resistance of the battery 7.

In step ST135, the ECU 8 specifically controls the drive and the regeneration of the electric motor 3 to charge/discharge the battery 7 such that the peak value of the current of the charge/discharge of the battery 7 becomes 10 A and the frequency of the current at the time of charge/discharge becomes 200 Hz.

The control method for the hybrid vehicle described above may be applied to, for example, a hybrid vehicle which has an engine 2 and an electric motor 3 connected to a battery 7 and which is provided with an ECU 8 that makes it possible to engage/disengage the transfer of the motive power from the electric motor 3 and/or the engine 2 to drive wheels 4 through the intermediary of a transmission and the transfer of the motive power between the electric motor 3 and the engine 2. In this case, the drive or the regeneration of the electric motor 3 is controlled with the transmission set in the neutral state.

The hybrid vehicle according to the fourth embodiment has been provided with a first clutch C1 capable of engaging/disengaging the transmission of motive power from the electric motor 3 or the engine 2 to the drive wheels 4, a second clutch C2 capable of engaging/disengaging the transmission of motive power between the electric motor 3 and the engine 2, and the ECU 8 which controls the first clutch C1 and the second clutch C2; however, the hybrid vehicle is not limited to this type.

For example, the present invention may be applied to a hybrid vehicle having a relatively simple construction. More specifically, the operations in accordance with the present invention described above may be performed in a hybrid vehicle which has an engine 2, an electric motor 3 connected to an output shaft actuated by electric power supplied from a battery 7, and a staged transmission, and which adjusts the rotational speed of the stepped transmission by the electric motor 3 to change the speed.

The transmission of a motive power transmission system 1 of the hybrid vehicle according to the fourth embodiment may be formed of the transmission having seven transmission stages, namely, a 1st-speed stage through a 7th-speed stage, as illustrated in FIG. 12. In this case also, the ECU 8 may carry out the same control.

[Fifth Embodiment]

A hybrid vehicle according to a fifth embodiment of the present invention will now be described. The hybrid vehicle according to the fifth embodiment is a hybrid vehicle having the same construction as that of the first embodiment and has a transmission equipped with a 1st-speed stage to a 5th-speed stage. The descriptions of the same constructions and functions as those of the first embodiment will be omitted. The following will describe the function of a low/high temperature processor 8d in the fifth embodiment.

Figure 17:
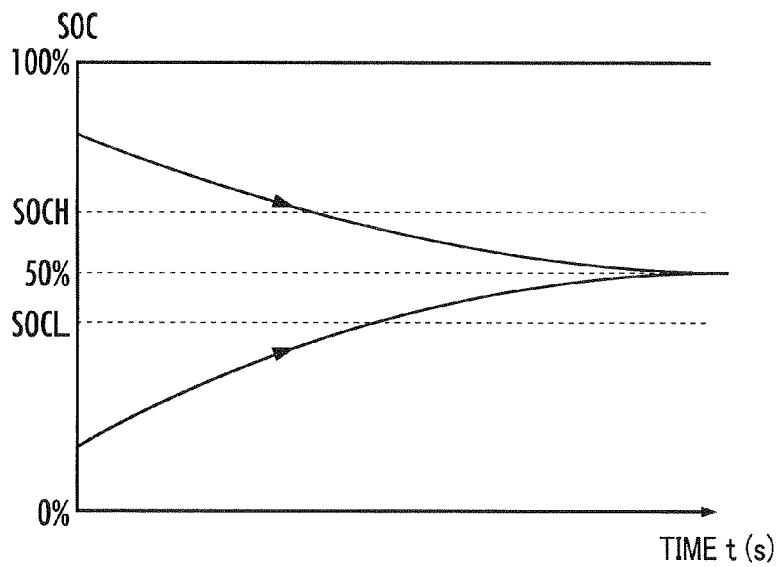
FIG. 17 is a graph illustrating the operation for controlling the SOC of the battery of the hybrid vehicle according to a fifth embodiment of the present invention to 50%.

As illustrated in FIG. 17, if the temperature of the battery 7 detected by a temperature sensor 8a is below a first predetermined temperature TL or equal to or higher than a second predetermined temperature TH, which is higher than the first predetermined temperature TL, then the low/high temperature processor 8d carries out control to set the SOC of the battery 7 to a value in an intermediate range (e.g., 50%) on the basis of a detection result supplied by a SOC sensor 8b.

Further, if the SOC is other than 50%, then the low/high temperature processor 8d carries out control to allow motive power to be transmitted from an engine 2 to drive wheels 4 through the intermediary of the transmission and also carries out control of the drive or the regeneration of the electric motor 3 on the basis of the SOC of the battery 7 such that the SOC will be 50%.

More specifically, when the temperature of the battery 7 is low or high, if the SOC of the battery 7 is higher than 50% (e.g., if the SOC is 75%), then an ECU 8 carries out processing so as to set the SOC to 50%. Specifically, the ECU 8 engages, for example, an assist mode to travel by driving the engine 2 and the electric motor 3, or driving an assist device 5 (a compressor or the like) in a state wherein the electric motor 3 and the engine 2 have been disconnected by a first clutch C1 so as to discharge the battery 7 such that the SOC becomes 50%.

When the temperature of the battery 7 is low or high, if the SOC of the battery 7 is lower than 50% (e.g., if the SOC is 25%), then the ECU 8, for example, controls the regeneration of the electric motor 3 thereby to charge the battery 7 so as to control the SOC to 50%.

When controlling the SOC of the battery 7, a predetermined range may be imparted to the 50% SOC. More specifically, the ECU 8 may control the drive or the regeneration such that the SOC will be a first threshold value SOCL or more and below a second threshold value SOCH. According to the fifth embodiment, for example, the first threshold value SOCL is set to 45% and the second threshold value SOCH is set to 55%. The first threshold value SOCL and the second threshold value SOCH are set as necessary according to a traveling condition. This makes it possible to reduce the load of processing on the ECU 8.

Further, the low/high temperature processor 8d in the fifth embodiment enables the transmission of motive power from the engine 2 to the drive wheels 4 through the intermediary of an even-numbered stage (a second transmission group) and also specified a transmission stage of a first transmission group (an odd-numbered stage) on the basis of the SOC of the battery 7 detected by a SOC sensor 8b.

Figure 18:
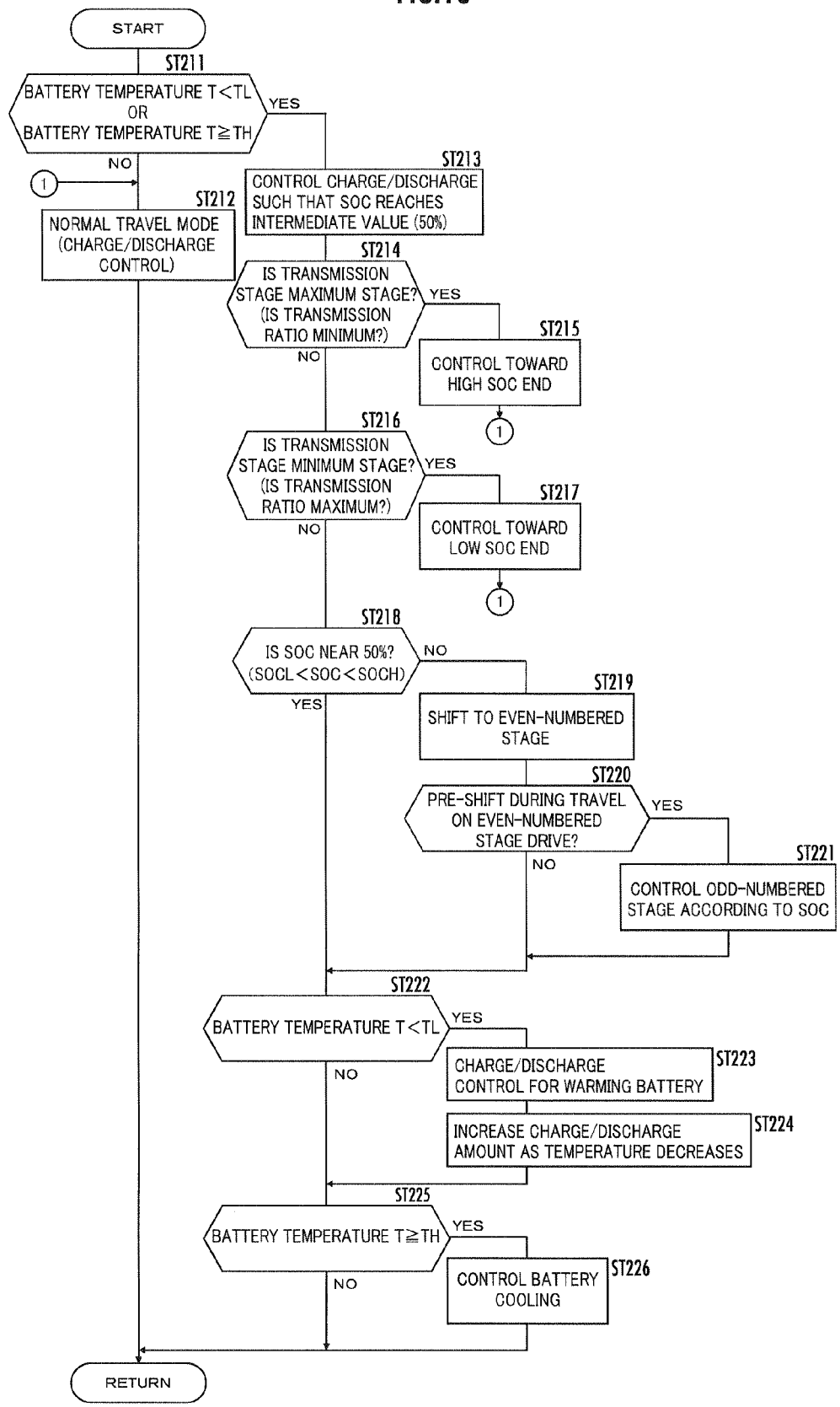
FIG. 18 is a flowchart illustrating the operation of the hybrid vehicle according to the fifth embodiment of the present invention.

Referring now to FIG. 18, the operation of the hybrid vehicle according to the fifth embodiment, more specifically, the operation for controlling the SOC to 50% when the temperature of the battery 7 is low or high, will be described. The operation is implemented by the ECU 8.

In step ST211, the ECU 8 determines whether the temperature of the battery 7 is below the first predetermined temperature TL or the second predetermined temperature TH or higher. If the result of the determination indicates that the temperature of the battery 7 is below the first predetermined temperature TL or the second predetermined temperature TH or higher, then the ECU 8 proceeds to the processing in step ST213, or otherwise, proceeds to the processing in step ST212.

In step ST212, if the temperature of the battery 7 is within a normal temperature range (a normal temperature region), the ECU 8 carries out control to travel in a normal travel mode. At this time, the output of the battery 7 is larger than that at a low temperature or a high temperature. Hence, the hybrid vehicle according to the fifth embodiment enables gear shifting to be accomplished relatively quickly, independently of the SOC.

In step ST213, the ECU 8 controls the charge/discharge to set the SOC of the battery 7 to an intermediate value (50%). More specifically, the ECU 8 carries out processing to discharge the battery 7 if the SOC is 50% or more, or carries out processing to charge the battery 7 if the SOC is below 50%.

In step ST214, the ECU 8 determines whether the transmission stage is a maximum stage (a minimum transmission ratio). If the result of the determination indicates that the transmission stage is the maximum stage (the minimum transmission ratio), then the ECU 8 proceeds to the processing in step ST215, or otherwise, proceeds to the processing in step ST216.

In step ST215, the ECU 8 permits the shift to a higher SOC if the transmission stage is the maximum stage (the minimum transmission ratio). More specifically, if a temperature T of the battery 7 is T<TL or T≥TH and the transmission stage has been set to the maximum stage (the minimum transmission ratio), then the ECU 8 controls the charge/discharge of the battery 7 so as to set the SOC to a higher SOC, specifically 50% or more and 100% or less, preferably 60% or more and 75% (the upper limit value of SOC during travel) or less. In other words, in the case of the aforesaid state, the ECU 8 carries out the charge/discharge control thereby to prohibit the SOC from becoming 50% or less.

The time required for a pre-downshift at a high SOC when the temperature is low or high is shorter than that in the case where the SOC is 50% when the temperature is low or high, thus making it possible to prevent the driveability from deteriorating. After the aforesaid processing in step ST215, the procedure proceeds to the processing in step ST212.

In step ST216, the ECU 8 determines whether the transmission stage is a minimum stage (a maximum transmission ratio). If the result of the determination indicates that the transmission stage is the minimum stage, then the ECU 8 proceeds to the processing in step ST217, or otherwise, proceeds to the processing in step ST218.

If the temperature T of the battery 7 is T<TL or T≥TH and the transmission stage has been set to the minimum stage (the maximum transmission ratio), then the ECU 8 controls, in step ST217, the charge/discharge of the battery 7 the charge/discharge of the battery 7 so as to set the SOC to a lower SOC, specifically 0% or more and below 50%, preferably 25% or more and below 40% (the upper limit value of SOC during travel) or less. In other words, in the case of the aforesaid state, the ECU 8 carries out the charge/discharge control thereby to prohibit the SOC of the battery 7 from becoming 50% or more.

The time required for a pre-upshift at a low SOC when the temperature is low or high is shorter than that in the case where the SOC is 50% when the temperature is low or high, thus making it possible to prevent the driveability from deteriorating. After the aforesaid processing in step ST217, the procedure proceeds to the processing in step ST212.

In step ST218, the ECU 8 determines whether the SOC of the battery 7 is in the vicinity of 50%. More specifically, it is determined whether the SOC of the battery 7 is larger than a predetermined lower limit value SOCL and smaller than a predetermined upper limit value SOCH. If it is determined that the SOC of the battery 7 is in the vicinity of 50%, then the ECU 8 proceeds to the processing in step ST222, or otherwise, proceeds to the processing in step ST219.

In step ST219, the ECU 8 carries out control to shift the gear to an even-numbered stage on a shaft to which the electric motor 3 is not connected. More specifically, the ECU 8 shifts the gear to the even-numbered stage on the shaft, to which the electric motor 3 is not connected, releases a first clutch C1 to disconnect the electric motor 3 from a foot axis, and carries out drive or regeneration control on the electric motor 3 so as to set the SOC to 50%.

Specifically, if the SOC of the battery 7 is higher than 50%, then the drive control is carried out. For example, an operation, such as idling the electric motor 3 with a load applied, driving a compressor or the like serving as an assist device 5, or assisting the engine, is performed. If the SOC of the battery 7 is lower than 50%, then regeneration control is carried out. Specifically, the regeneration control is carried out on the electric motor 3 on the basis of the driving force of the engine 2.

In step ST220, the ECU 8 determines whether to pre-shift to an odd-numbered stage during the travel on the engine drive in the state wherein the even-numbered stage has been selected. If the ECU 8 determines to pre-shift to the odd-numbered stage, then it proceeds to the processing in step ST221.

In step ST221, the ECU 8 controls the odd-numbered stage according to the SOC of the battery 7. More specifically, in the case where a pre-shift from an even-numbered stage to an odd-numbered stage is implemented, the drive or regeneration control on the electric motor 3 is carried out to charge/discharge the battery 7, so that the battery 7 is managed on the basis of the SOC. Specifically, the transmission stage selected by a first synchronous engaging mechanism S1 is changed on the basis of the SOC. For example, as the SOC of the battery 7 increases, a transmission stage with a higher transmission ratio is set. Thus, even when the temperature of the battery 7 is low or high, relatively short gear shifting time is required for the shift from a second transmission group (even-numbered stages) to a first transmission group (odd-numbered stages), making it possible to prevent the driveability from deteriorating.

Further, at the time of the aforesaid gear shifting, if the SOC is below 50%, then the ECU 8 may carry out control to permit a pre-upshift and to prohibit a pre-downshift. If the SOC is 50% or more, then the ECU 8 may carry out control to permit the pre-downshift and to prohibit a pre-upshift. This makes it possible to reduce the time required for the aforesaid gear shifting to relatively short time, thus permitting the prevention of deteriorated driveability.

In step ST222, the ECU 8 determines whether the temperature of the battery 7 is below the first predetermined temperature TL. If the result of the determination indicates that the temperature of the battery 7 is below the first predetermined temperature TL, then the ECU 8 proceeds to the processing in step ST223, or otherwise, it proceeds to the processing in step ST225.

In step ST223, the ECU 8 carries out the charge/discharge control for warming the battery 7. At this time, after discharging the battery 7 by conducting the drive control on the electric motor 3, the ECU 8 carries out the regeneration control on rotating members, such as the electric motor 3 and the motive power transmission shaft, which are rotating by inertia, so as to charge the battery 7. At this time, as illustrated in FIG. 13, switching between the drive and the regeneration at a relatively high frequency causes the battery 7 to be charged/discharged, and alternating current passing through an internal resistor (AC resistor) of the battery 7 causes the battery 7 itself to generate heat. Further, at this time, the ECU 8 may carry out control to heat a vehicle compartment 100a by an air conditioner 40 and drive a blower 7a provided in the vicinity of the battery 7 to warm the battery 7 in a low temperature state by the air in the vehicle compartment 100a.

In step ST224, the ECU 8 carries out the charge/discharge control to increase the magnitude (e.g., the effective value) of the current at the time of charge/discharge as the temperature T of the battery 7 decreases, as illustrated in FIG. 14.

In step ST225, the ECU 8 determines whether the temperature T of the battery 7 is higher than the second predetermined temperature TH. If the ECU 8 determines that the temperature T is higher than the second predetermined temperature TH, then it carries out control to cool the battery 7. More specifically, the ECU 8 drives the blower 7a provided in the vicinity of the battery 7 to dissipate the heat of the battery 7 in the high temperature state. At this time, the ECU 8 drives the compressor of the air conditioner 40 to cool the vehicle compartment 100a and also drives the blower 7a to send the relatively low-temperature air in the vehicle compartment to the battery 7, thereby releasing the heat of the battery 7 in the high temperature state.

Then, after the aforesaid processing, the procedure returns to the processing in step ST211.

As described above, in the hybrid vehicle according to the fifth embodiment, if the temperature detected by the temperature sensor 8a is below the first predetermined temperature TL or equal to or higher than the second predetermined temperature TH, which is higher than the first predetermined temperature TL, then the ECU 8 controls the SOC of the battery 7 to an intermediate value (50%) on the basis of the detection result supplied by the SOC sensor 8b.

More specifically, when the temperature of the battery 7 is low or high, setting the SOC of the battery 7 to the intermediate value (50%) makes it possible to reduce the time required for a downshift from a predetermined transmission stage and the time required for an upshift from the predetermined transmission stage, respectively, to relatively short time. To be more specific, the time required for the downshift from a predetermined transmission stage (an even-numbered stage) to an odd-numbered stage and the time required for the upshift to an odd-numbered stage, respectively, can be reduced to relatively short time. This makes it possible to provide a hybrid vehicle capable of preventing the driveability thereof from deteriorating at the time of gear shifting even when the temperature of the battery 7 is low or high.

Further, in the case other than the case where the SOC of the battery 7 is 50%, the ECU 8 carries out control to allow motive power to be transmitted from the engine 2 to the drive wheels 4 through the intermediary of the transmission and also carries out the drive or regeneration control on the electric motor 3 such that the SOC of the battery 7 becomes 50% on the basis of the SOC of the battery 7. In other words, when the temperature of the battery 7 is low or high, the SOC of the battery 7 can be set to 50% relatively easily and quickly.

Further, as described above, the transmission of the hybrid vehicle according to the fifth embodiment has the first transmission group (odd-numbered stages) equipped with the plurality of transmission stages having different transmission ratios, which are capable of transmitting motive power from the electric motor 3 and/or the engine 2 to the drive wheels 4, and a second transmission group (even-numbered stages) capable of transmitting motive power from the engine 2 to the drive wheels 4. The ECU 8 allows the motive power to be transmitted from the engine 2 to the drive wheels 4 through the intermediary of the second transmission group (even-numbered stages) and specifies the transmission ratio of the first transmission group (odd-numbered stages) on the basis of the SOC of the battery 7 detected by the SOC sensor 8b at the time of a pre-shift. Then, the ECU 8 sets, for example, an odd-numbered transmission stage of a higher transmission ratio as the SOC of the battery 7 increases. This means that whether the temperature of the battery 7 is low or high, the time required for gear shifting from an even-numbered stage (the second transmission group) to an odd-numbered stage (the first transmission group) can be made relatively short, permitting the prevention of the deterioration of the driveability.

Further, in the embodiments described above, if the temperature detected by the temperature sensor 8a is below the first predetermined temperature TL, then the ECU 8 carries out the drive or regeneration control on the electric motor so as to increase the charge/discharge of the battery 7 on the basis of the temperature of the battery 7 as the temperature decreases. More specifically, the drive or regeneration control on the electric motor 3 is carried out so as to increase the amount of charge/discharge of the battery 7 as the temperature of the battery 7 decreases. More specifically, the SOC of the battery 7 can be set to 50% in relatively short time.

Further, in the embodiments described above, the ECU 8 carries out the drive or regeneration control on the electric motor 3 to charge/discharge the battery 7 thereby to warm the battery 7. In other words, current is passed through the internal resistor of the battery 7 so as to warm the battery 7. This makes it possible to change the temperature of the battery 7 from a low temperature to the normal temperature in relatively short time. In other words, the travel mode in which the temperature of the battery 7 is low can be shifted in relatively short time to the travel mode in which the temperature thereof is normal.

Further, in the embodiments described above, if the transmission stage of the transmission is the maximum stage (e.g., the 5th-speed stage), then the ECU 8 implements control to set the SOC of the battery 7 to be larger than 50%. When the temperature of the battery 7 is low or high, if the SOC of the battery 7 is larger than 50%, then the battery 7 has a relatively large assist output (discharge amount). Hence, the time required to shift the transmission stage from the maximum stage to another transmission stage (a transmission stage having a larger transmission ratio than that of the maximum stage) will be relatively short, thus allowing relatively high driveability to be achieved.

Further, if the transmission stage of the transmission is the minimum stage (the 1st-speed stage), then the ECU 8 carries out control so as to set the SOC of the battery 7 to be smaller than 50%. More specifically, when the temperature of the battery 7 is low or high, if the SOC of the battery 7 is smaller than 50%, then the battery 7 has a relatively large regenerative output. Hence, the time required to shift from the minimum stage (the 1st-speed stage) to another transmission stage (a transmission stage having a smaller transmission ratio than that of the minimum stage) will be relatively short, allowing relatively high driveability to be achieved.

Further, the transmission of the motive power transmission system 1 of the hybrid vehicle according to the fifth embodiment may be formed of a transmission having seven transmission stages, namely, a 1st-speed stage through a 7th-speed stage, as illustrated in FIG. 12. In this case also, the ECU 8 may carry out the same control according to the temperature of the battery 7.

[Sixth Embodiment]

The hybrid vehicle according to a sixth embodiment of the present invention will now be described. The hybrid vehicle according to the sixth embodiment is a hybrid vehicle having the same construction as that of the fifth embodiment and has a transmission equipped with a 1st-speed stage to a 5th-speed stage. The descriptions of the same constructions and functions as those of the fifth embodiment will be omitted.

Figure 19:
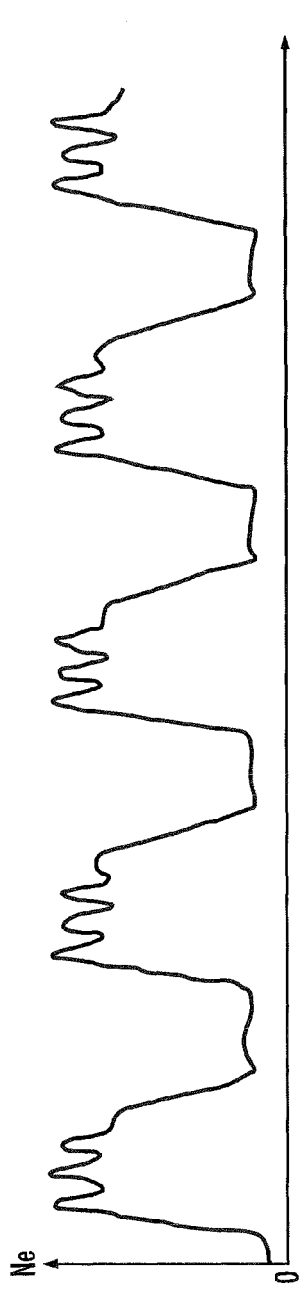
FIG. 19 shows charts illustrating the operation at the time of snapping while the engine of the hybrid vehicle according to a sixth embodiment of the present invention is idling.
Figure 19:
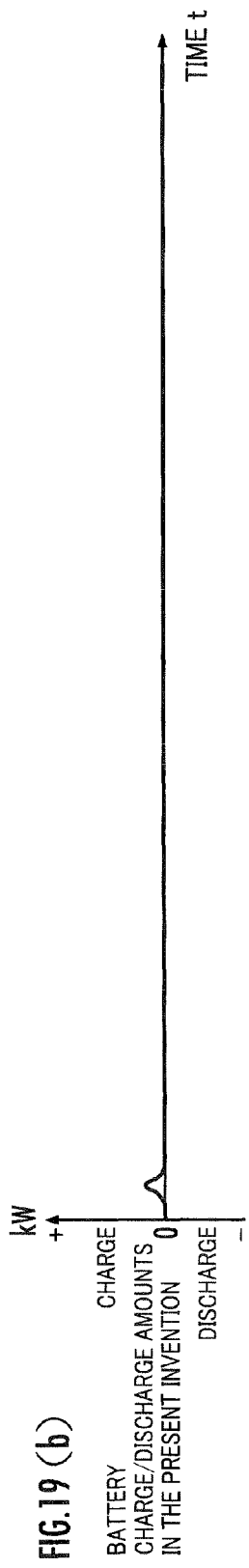
Figure 19:
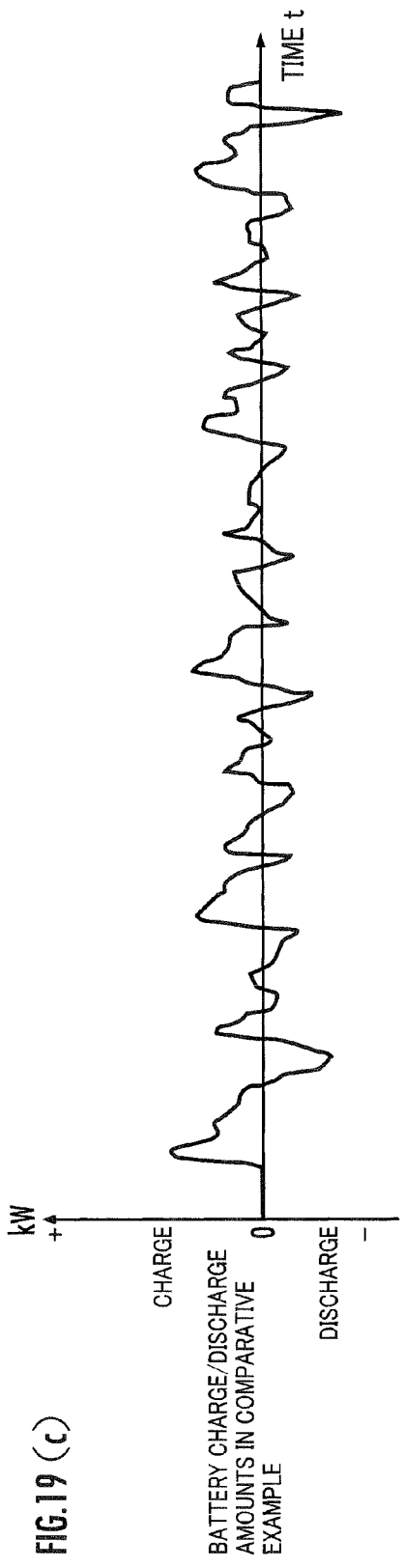

In the hybrid vehicle according to the sixth embodiment, if a snapping operation is performed while the engine 2 is idling when the temperature of the battery 7 is extremely low, namely, a third predetermined temperature TLa or lower, then a low/high temperature processor 8d carries out control to release the connection between an engine 2 and an electric motor 3 by a first clutch C1. The snapping operation is an operation in which the opening degree of an accelerator pedal is increased or decreased at a relatively short cycle when the engine 2 is idling (running at a predetermined rotational speed, e.g., 700 rpm). For example, an engine rotational speed Ne is increased or decreased at a relatively short cycle, as illustrated in FIG. 19(a). More specifically, in the hybrid vehicle according to the sixth embodiment, when the snapping operation is being performed while the engine 2 is idling, the charge/discharge of a battery 7 is not effected, as illustrated in, for example, FIG. 19(b), so that the load on the battery 7 can be reduced.

Meanwhile, in the hybrid vehicle of a comparative example, if a snapping operation is performed on an engine 2 while the engine 2 is idling, there are cases where electric power is input to or output from the battery 7, as illustrated in, for example, FIG. 19(c), even when the input/output of electric power to/from the battery 7 is prohibited. At this time, the charge/discharge performance of the battery 7 may be deteriorated. More specifically, in the case where the snapping operation is carried out while the engine 2 is idling, the engine 2 and the electric motor 3 being connected by the first clutch C1, if the rotational speed of the electric motor 3 suddenly increases, then surplus electric power of generated electric power is input to the battery 7. Further, if the rotational speed of the electric motor 3 suddenly decreases, then the rotational speed of the engine decreases. Hence, the regenerative torque of the motor is decreased to prevent a stall of the engine 2. This disables the supply of the load electric power for driving an assist device 5 from the electric motor 3, so that the electric power of the battery 7 will be used. In other words, in the case of the hybrid vehicle of the comparative example, the electric power may be input/output even when the input/output of the electric power of the battery 7 is prohibited (when the temperature of the battery is high or low).

Figure 20:
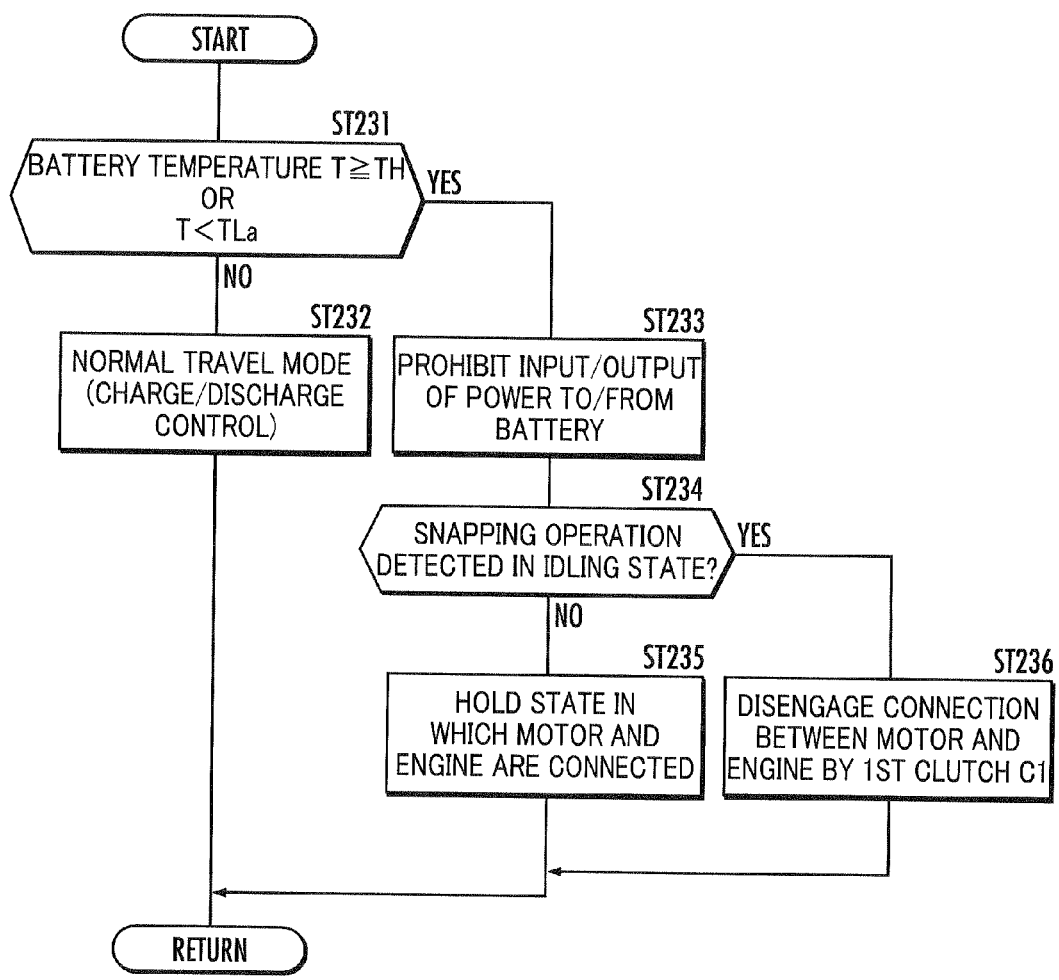
FIG. 20 is a flowchart illustrating the operation of the hybrid vehicle according to the sixth embodiment of the present invention.

Referring now to FIG. 20, the description will be given of the operation performed when the snapping operation is effected while the engine of the hybrid vehicle according to the sixth embodiment is idling.

In step ST231, an ECU 8 determines whether the temperature of the battery 7 is below the third predetermined temperature TLa (e.g., −30° C.) or whether the temperature of the battery 7 is a second predetermined temperature TH (e.g., 49° C.) or higher. If the result of the determination indicates that the temperature of the battery 7 is below the third predetermined temperature TLa or the second predetermined temperature TH or higher, then the ECU 8 proceeds to the processing in step ST233, or otherwise, proceeds to the processing in step ST232.

In step ST232, the ECU 8 effects the travel in a normal travel mode if the temperature of the battery 7 is within a normal temperature range.

In step ST233, the ECU 8 prohibits the input/output of electric power to/from the battery 7.

In step ST234, the ECU 8 determines whether the snapping operation has been effected on the basis of the detection by a driving force request setter 9 while the engine 2 was idling. If the ECU 8 determines that the snapping operation has been effected, then the ECU 8 proceeds to the processing in step ST236, or otherwise, proceeds to the processing in step ST235.

In step ST235, the ECU 8 holds a state in which the electric motor 3 and the engine 2 are connected by the first clutch C1, and runs the engine 2 in that state. When the temperature is extremely low (in the case where the temperature is −30° C. or lower), heat is conducted to the electric motor 3 from the engine 2 and the electric motor 3 is warmed by the revolution of the electric motor 3 run by the engine 2 in that state.

Further, when the temperature is high (49° C. or higher), control is carried out in this state to drive a blower 7a so as to cool the battery 7.

In step ST236, the ECU 8 carries out control to discontinue the connection between the electric motor 3 and the engine 2 by the first clutch C1. The control is carried out not to input/output electric power into/out of the battery 7 by releasing the connection of the first clutch C1.

After the processing in steps ST235 and ST236, the ECU 8 returns to the processing in step ST231. Then, when the battery temperature reaches a temperature of the first predetermined temperature TL or higher and below the second predetermined temperature TH, the travel mode is shifted to the travel mode at normal temperature (charge/discharge control based on the normal travel mode).

[Seventh Embodiment]

A hybrid vehicle according to a seventh embodiment of the present invention will now be described. The hybrid vehicle according to the seventh embodiment is a hybrid vehicle having the same construction as that of the fifth embodiment and has a transmission equipped with a 1st-speed stage to a 5th-speed stage. The descriptions of the same constructions and functions as those of the fifth embodiment will be omitted.

Figure 21:
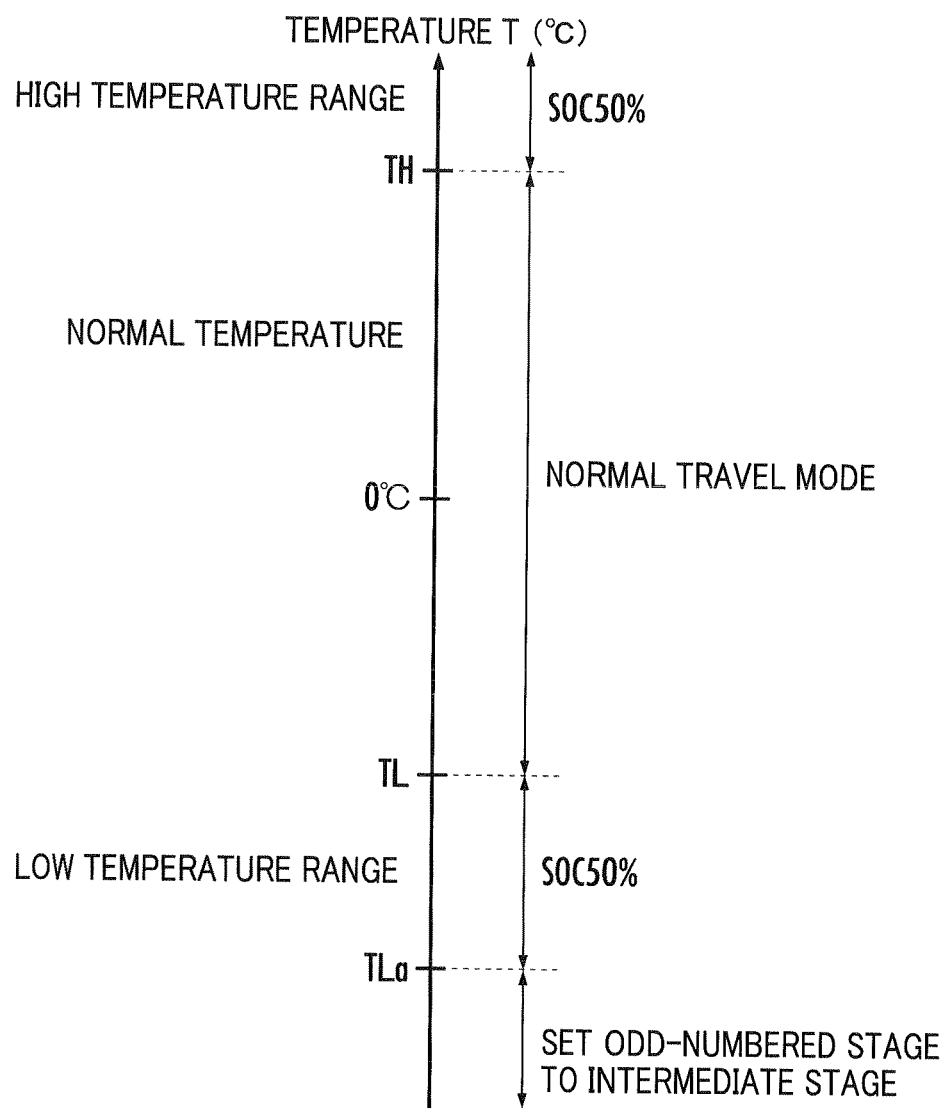
FIG. 21 is a diagram illustrating the battery control based on the temperature of the hybrid vehicle according to a seventh embodiment of the present invention.

As illustrated in FIG. 21, in the hybrid vehicle according to the seventh embodiment, when the temperature of a battery 7 is normal temperature (temperature T<TH and TL<T), a normal travel mode is set. If the temperature of the battery 7 is high (battery temperature T≥TH), then the ECU 8 carries out control such that the SOC of the battery 7 becomes 50%, as with the first embodiment. If the temperature of the battery 7 is low (temperature T<TL), then the ECU 8 carries out control such that the SOC of the battery 7 becomes 50%.

For example, if the temperature of the battery 7 is extremely low (temperature T<TLa (a third predetermined temperature TLa being −30° C.)), then the ECU 8 carries out control to specify an intermediate stage (e.g., a 3rd-speed stage) of a first transmission group (odd-numbered stages). More specifically, the ECU 8 restricts the transmission stage to an intermediate stage among the transmission stages of a first transmission group makes it possible to prevent the deterioration of the gear shift responsiveness and the deterioration of the driveability by having the vehicle travel with the transmission stage limited to the intermediate stage among the transmission stages of the first transmission group (odd-numbered stages), without the need for performing, for example, the operation for adjusting the rotational speed to a target transmission stage by the electric motor 3 at the time of gear shifting. Further, at this time, even when changing the speed from an intermediate stage of the first transmission group to a second transmission group (even-numbered stages), there is no need to perform the operation for making adjustment to the rotational speed of a target transmission stage by the electric motor 3 at the time of the gear shifting, thus permitting the prevention of the deterioration of the driveability.

The seven embodiments, namely, the first to the seventh embodiments, in accordance with the present invention have been described above; however, the present invention is not limited to the aforesaid seven embodiments. For example, the transmission of the motive power transmission system of the hybrid vehicle may have the 1st-speed stage to the 7th-speed stage, as illustrated in FIG. 12, or may have even more transmission stages.

Further, for example, the motive power transmission system of the hybrid vehicle may be constructed such that the rotor of an electric motor and the ring gear of a planetary gear mechanism are mutually secured with each other, while the rotor of the electric motor and a sun gear are mutually rotatable, not being secured.

Further, the configuration of the ECU 8 is not limited to the type described above.

INDUSTRIAL APPLICABILITY

As described above, since the hybrid vehicle according to the present invention is capable of preventing driveability from deteriorating even when the temperature of an electricity storage device is low or high, it is useful for preventing the deterioration of the driveability of a hybrid vehicle.

The invention claimed is:

1. A hybrid vehicle having an internal-combustion engine and an electric motor connected to an electricity storage device, comprising:
a motive power transmitting system; and
an electronic control unit that enables engagement and disengagement of a transfer of the motive power from one or both of the electric motor and the internal-combustion engine to a driven section and a transfer of the motive power between the electric motor and the internal-combustion engine through the motive power transmitting system, further comprising:
a temperature sensor which detects the temperature of the electricity storage device;
wherein the motive power transmitting system has a first transmission system capable of transferring the motive power from one or both of the electric motor and the internal-combustion engine to the driven section at a plurality of first transmission stages having different transmission ratios, and a second transmission system capable of transferring the motive power from the internal-combustion engine at a plurality of second transmission stages having different transmission ratios, and
the electronic control unit controls the outputs of the electric motor and the internal-combustion engine such that a transmission stage is shifted to either the one transmission stage of the first transmission system or one of the pair of transmission stages of the second transmission system in a low temperature state, in which the temperature is below a first predetermined temperature, or a high temperature state, in which the temperature is equal to or higher than a second predetermined temperature, which is higher than the first predetermined temperature.

2. The hybrid vehicle according to claim 1, wherein the electronic control unit has a control interface for controlling the outputs of the electric motor and the internal-combustion engine according to one of multiple different manners each corresponding to each of the low temperature state, the high temperature state, and a normal state, which is neither the low temperature state nor the high temperature state.

3. The hybrid vehicle according to claim 2, wherein the electronic control unit carries out control to run the electric motor by enabling the transmission of the motive power from the internal-combustion engine to the driven section through the second transmission system and also enabling the transmission of the motive power between the electric motor and the driven section through the first transmission system in the low temperature state.

4. The hybrid vehicle according to claim 3, wherein the electronic control unit carries out control so as to enable the transmission of the motive power between the electric motor and the internal-combustion engine and also to transmit the motive power from the internal-combustion engine and the electric motor to the driven section through the first transmission system in the low temperature state.

5. The hybrid vehicle according to claim 1, comprising: an electronic device which is driven by the output of the electric motor or the internal-combustion engine, wherein the electronic device is driven by an intermediate stage of the first transmission system in the high temperature state.

6. The hybrid vehicle according to claim 5, wherein the electronic device is a compressor of an air conditioning unit, and the electricity storage device is cooled through the interior of the vehicle by driving the compressor.

7. The hybrid vehicle according to claim 1 comprising:
an air conditioning unit driven through the first transmission system,
wherein the electronic control unit drives the air conditioning unit by the electric motor in the low temperature state.

8. The hybrid vehicle according to claim 7,
wherein the air conditioning unit includes a heater to warm air in a vehicle compartment, and the hybrid powertrain comprising a blower for sending air heated by the air conditioning unit in the vehicle compartment to the electricity storage device.

9. The hybrid vehicle according to claim 1, wherein the motive power transmitting system comprises a dual clutch system, and a power transmission path with the motive power transmitting system does not overlap as a result of the dual clutch system.

* * * * *